US012623844B2

(12) United States Patent (10) Patent No.: US 12,623,844 B2
Zhao (45) Date of Patent: May 12, 2026

(54) ADJUSTMENT METHOD, APPARATUS, AND DEVICE FOR MATERIAL HANDLING APPARATUS

(71) Applicant: HAI ROBOTICS CO., LTD., Shenzhen (CN)

(72) Inventor: Ying Zhao, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 273 days.

(21) Appl. No.: 18/503,571

(22) Filed: Nov. 7, 2023

(65) Prior Publication Data

US 2024/0067450 A1 Feb. 29, 2024

Related U.S. Application Data

(63) Continuation of application No. PCT/CN2022/071764, filed on Jan. 13, 2022.

(30) Foreign Application Priority Data

May 12, 2021 (CN) .......................... 202110517215.0

(51) Int. Cl.
B65G 1/137 (2006.01)
B65G 1/04 (2006.01)
G06T 7/73 (2017.01)

(52) U.S. Cl.
CPC .......... B65G 1/1373 (2013.01); B65G 1/0435 (2013.01); B65G 2203/0216 (2013.01);
(Continued)

(58) Field of Classification Search
CPC ................ B65G 1/1373; B65G 1/0435; B65G 2203/0216; B65G 2203/0283; G06T 7/73;
(Continued)

(56) References Cited

U.S. PATENT DOCUMENTS

2019/0310655 A1* 10/2019 Voorhies .............. G05D 1/0287
2019/0347520 A1* 11/2019 Sato ........................ G06V 20/10
(Continued)

FOREIGN PATENT DOCUMENTS

CN        105752888 A        7/2016
CN        106556341 A        4/2017
(Continued)

OTHER PUBLICATIONS

International Search Report for PCT/CN2022/071764; mailed Apr. 14, 2022.
Cited in the search report of EP22806199.0,dated Jul. 18, 2024.

*Primary Examiner* — Thomas E Worden
*Assistant Examiner* — Jay Khandpur
(74) *Attorney, Agent, or Firm* — Ladas & Parry, LLP

(57) ABSTRACT

The embodiments of the present application provide a method, apparatus, and device for adjusting a material handling apparatus of a robot. The method includes: acquiring a first detection image through an image acquisition apparatus when the robot moves to a target ground identifier corresponding to a target storage location; determining a pose position relationship between the target storage location and the image acquisition apparatus based on preset key points in the first detection image; and adjusting the material handling apparatus of the robot to be aligned with the target storage location based on the pose position relationship, so that an insert plate of the material handling apparatus is placed between a first supporting portion and a second supporting portion. In this way, the material handling apparatus is calibrated before goods are retrieved or stored, which avoids collisions during goods retrieval and storage and improves operation safety of the robot.

15 Claims, 10 Drawing Sheets

(52) U.S. Cl.
CPC ........ *B65G 2203/0283* (2013.01); *G06T 7/73*
(2017.01); *G06T 2207/10028* (2013.01); *G06T*
*2207/10032* (2013.01); *G06T 2207/30204*
(2013.01)

(58) Field of Classification Search
CPC . G06T 2207/10028; G06T 2207/10032; G06T
2207/30204
See application file for complete search history.

(56) References Cited

U.S. PATENT DOCUMENTS

| | | | | |
|---|---|---|---|---|
| 2020/0083017 A1* | 3/2020 | Harada | ................ | G01N 21/956 |
| 2022/0063907 A1* | 3/2022 | Park | ......................... | B65G 1/06 |
| 2022/0219902 A1* | 7/2022 | Zheng | ................. | G05D 1/0094 |
| 2023/0159274 A1* | 5/2023 | Liu | ......................... | B25J 5/007 |
| | | | | 700/214 |

FOREIGN PATENT DOCUMENTS

| | | | |
|---|---|---|---|
| CN | 108217045 | A | 6/2018 |
| CN | 109650292 | A | 4/2019 |
| CN | 110135439 | A | 8/2019 |
| CN | 111169894 | A | 5/2020 |
| CN | 111348361 | A | 6/2020 |
| CN | 210654762 | U | 6/2020 |
| CN | 111674817 | A | 9/2020 |
| CN | 111798183 | A | 10/2020 |
| CN | 111890343 | A | 11/2020 |
| CN | 112124304 | A | 12/2020 |
| CN | 112660686 | A | 4/2021 |
| CN | 113213054 | A | 8/2021 |
| JP | 2016033775 | A | 3/2016 |
| JP | 2017116482 | A | 6/2017 |

* cited by examiner

S501

Acquire a first detection image through an image acquisition apparatus when a robot moves to a target ground identifier

S502

Identify a rack identification code corresponding to the target storage location from the first detection image

S503

Determine an angle deviation, a height deviation, and a path deviation of the material handling apparatus based on position information of feature points of the rack identification code and angle information of an identification pattern of the rack identification code if the identification succeeds

S504

Adjust the image acquisition apparatus within a preset range and acquire at least one second detection image during adjustment and/or upon completion of the adjustment if the rack identification code corresponding to the target storage location is not identified from the first detection image

S505

Identify the rack identification code corresponding to the target storage location from the second detection image if the second detection image includes the rack identification code

S506

Determine a pose position relationship between the material handling apparatus and the target storage location based on an identification result

S507

Determine a storage location type of the target storage location

S508

Determine a preset deviation based on the storage location type of the target storage location

S509

Adjust the material handling apparatus based on the preset deviation, so as to adjust the path deviation to the preset deviation, and respectively adjust an angle and a height of the material handling apparatus based on the angle deviation and the height deviation, so that the material handling apparatus is aligned with the target storage location

FIG. 5

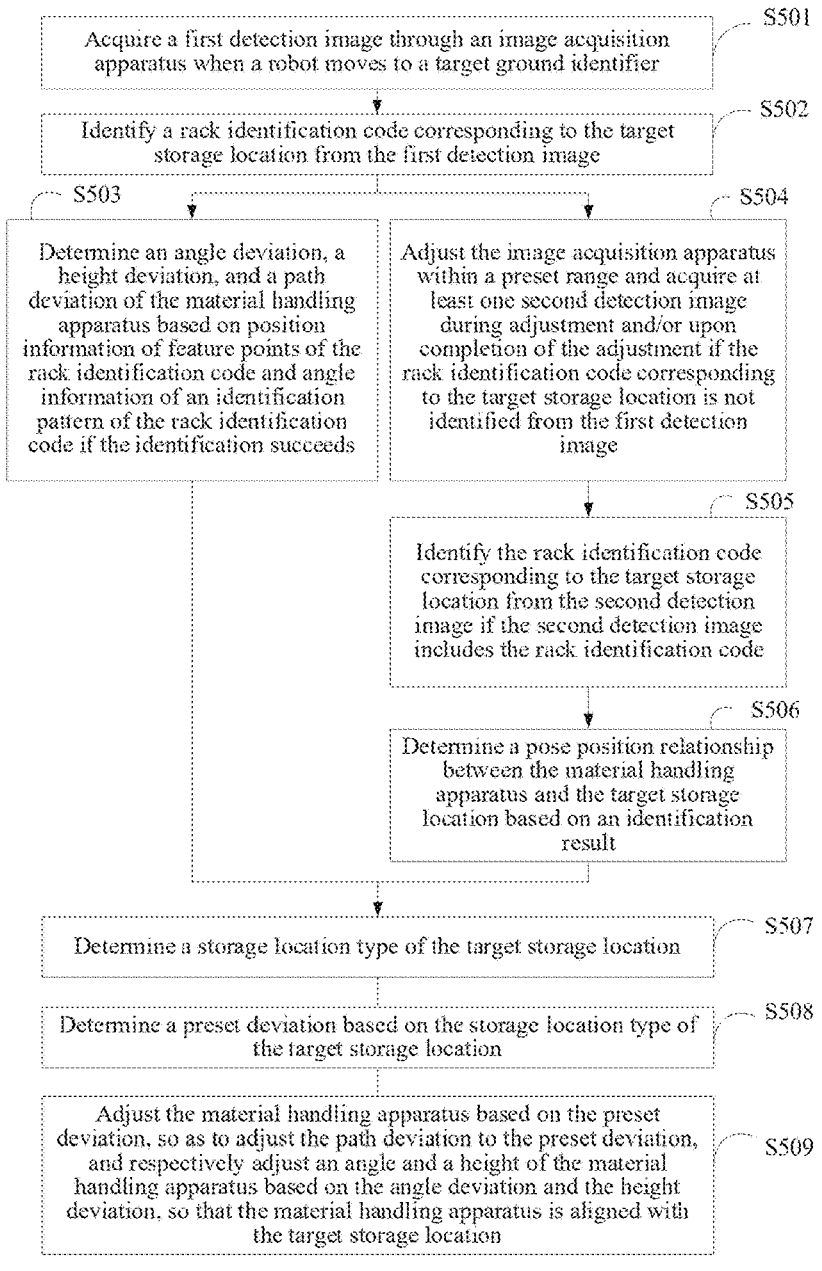

FIG. 6

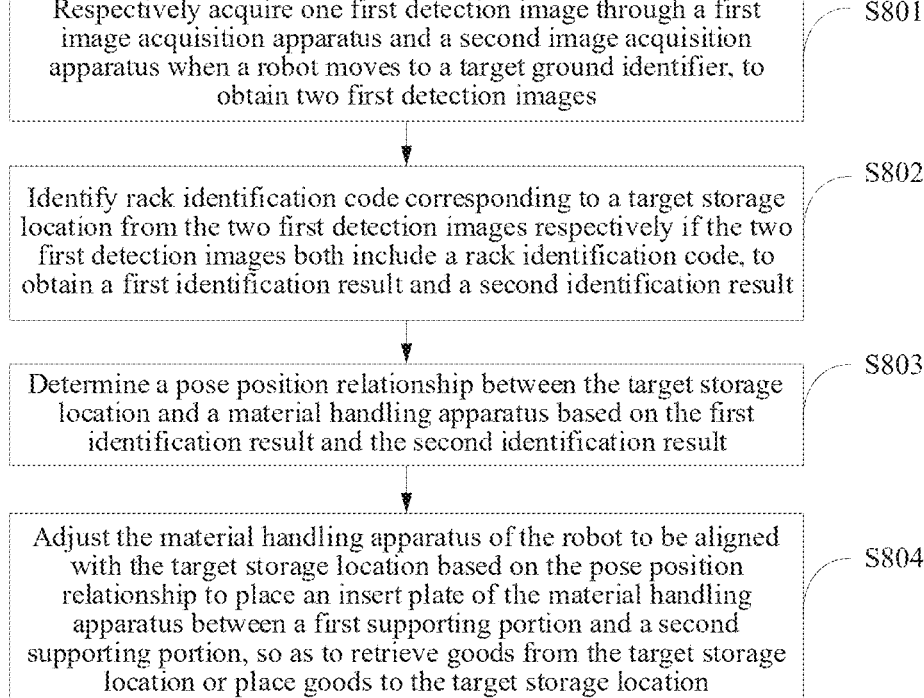

Respectively acquire one first detection image through a first image acquisition apparatus and a second image acquisition apparatus when a robot moves to a target ground identifier, to obtain two first detection images — S801

Identify rack identification code corresponding to a target storage location from the two first detection images respectively if the two first detection images both include a rack identification code, to obtain a first identification result and a second identification result — S802

Determine a pose position relationship between the target storage location and a material handling apparatus based on the first identification result and the second identification result — S803

Adjust the material handling apparatus of the robot to be aligned with the target storage location based on the pose position relationship to place an insert plate of the material handling apparatus between a first supporting portion and a second supporting portion, so as to retrieve goods from the target storage location or place goods to the target storage location — S804

FIG. 8

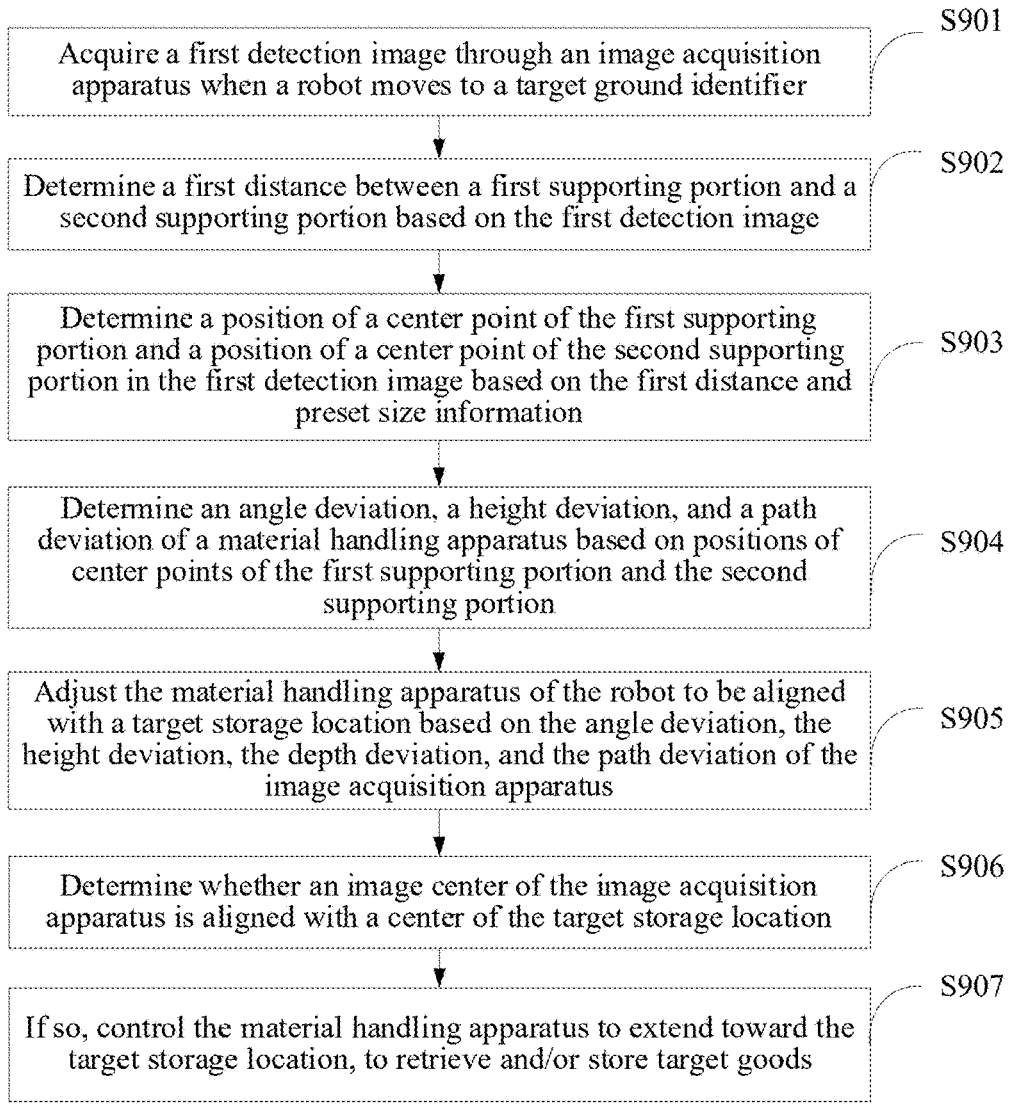

S901

Acquire a first detection image through an image acquisition apparatus when a robot moves to a target ground identifier

S902

Determine a first distance between a first supporting portion and a second supporting portion based on the first detection image

S903

Determine a position of a center point of the first supporting portion and a position of a center point of the second supporting portion in the first detection image based on the first distance and preset size information

S904

Determine an angle deviation, a height deviation, and a path deviation of a material handling apparatus based on positions of center points of the first supporting portion and the second supporting portion

S905

Adjust the material handling apparatus of the robot to be aligned with a target storage location based on the angle deviation, the height deviation, the depth deviation, and the path deviation of the image acquisition apparatus

S906

Determine whether an image center of the image acquisition apparatus is aligned with a center of the target storage location

S907

If so, control the material handling apparatus to extend toward the target storage location, to retrieve and/or store target goods

FIG. 9

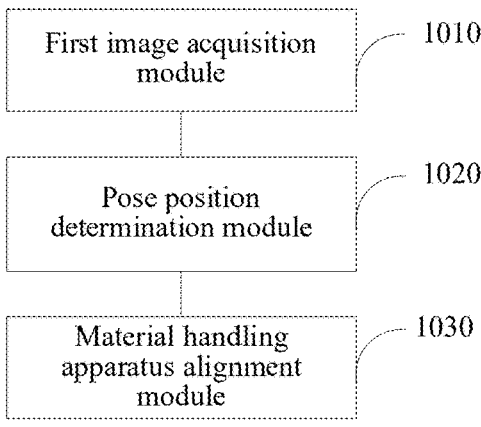

First image acquisition module — 1010

Pose position determination module — 1020

Material handling apparatus alignment module — 1030

FIG. 10

ADJUSTMENT METHOD, APPARATUS, AND DEVICE FOR MATERIAL HANDLING APPARATUS

CROSS-REFERENCE TO RELATED APPLICATIONS

This application is a continuation of International Patent Application No. PCT/CN2022/071764 filed on Jan. 13, 2022, which claims priority to Chinese Patent Application No. 202110517215.0 filed on May 12, 2021, which are both incorporated herein by reference in their entireties.

TECHNICAL FIELD

The present application relates to the technical field of intelligent warehousing, and in particular, to an adjustment method, apparatus, and device for a material handling apparatus, a robot, and a warehousing system.

BACKGROUND

An intelligent warehousing system based on a robot adopts an intelligent operating system, implements automatic retrieval and storage of containers through system instructions, and may also operate 24 hours a day without interruption, which replaces manual management and operation, improves the efficiency of warehousing, and has been widely applied and favored.

During retrieval or storage of the goods on a rack based on robots, the prior art often moves to a target storage location only based on corresponding instructions, so that the goods are directly placed at the target storage location, or the goods placed at the target storage location are directly retrieved, which easily leads to a collision between a material handling apparatus of the robot and the rack, causing damage of the rack or the robot and even the occurrence of accidents such as toppling of the rack, and resulting in poor safety of goods retrieval or storage operations.

SUMMARY

The present application provides an adjustment method, apparatus, and device for a material handling apparatus, a robot, and a warehousing system. Before retrieving or placing goods, an automatic calibration between the material handling apparatus and a target storage location is realized through an image acquisition apparatus, which improves safety of goods retrieval and storage.

According to a first aspect, an embodiment of the present application provides an adjustment method for a material handling apparatus. The method includes: acquiring a first detection image through the image acquisition apparatus when the robot moves to a target ground identifier, where the target ground identifier is a ground identifier corresponding to a target storage location, a supporting portion is arranged at the target storage location, and the supporting portion includes a first supporting portion and a second supporting portion at a same height to collaboratively place goods; determining a pose position relationship between the target storage location and the material handling apparatus based on information of preset key points in the first detection image, where the preset key points include points corresponding to a rack identification code and/or the supporting portions; and adjusting the material handling apparatus of the robot to be aligned with the target storage location based on the pose position relationship to place an insert plate of the material handling apparatus between the first supporting portion and the second supporting portion, so as to retrieve goods from the target storage location or place goods to the target storage location.

Optionally, the rack identification code is arranged on a rack column corresponding to the target storage location, and the determining the pose position relationship between the target storage location and the material handling apparatus based on the information of preset key points in the first detection image includes: identifying the rack identification code corresponding to the target storage location based on the first detection image; and determining the pose position relationship between the material handling apparatus and the target storage location based on an identification result if the identification succeeds.

Optionally, the determining the pose position relationship between the material handling apparatus and the target storage location based on an identification result includes: determining an angle deviation, a height deviation, and a path deviation of the material handling apparatus based on position information of feature points of the rack identification code and angle information of an identification pattern of the rack identification code, where the path deviation is a deviation of an image center between the image acquisition apparatus and a storage location center of the target storage location.

Optionally, the adjusting the material handling apparatus of the robot to be aligned with the target storage location based on the pose position relationship includes: determining a storage location type of the target storage location; determining a preset deviation based on the storage location type of the target storage location; adjusting the material handling apparatus based on the preset deviation, to adjust the path deviation to the preset deviation; and respectively adjusting an angle and a height of the material handling apparatus based on the angle deviation and the height deviation, so that the material handling apparatus is aligned with the target storage location.

Optionally, the method further includes: adjusting the image acquisition apparatus within a preset range and acquiring at least one second detection image during adjustment and/or upon completion of the adjustment if the rack identification code corresponding to the target storage location is not identified from the first detection image; identifying the rack identification code corresponding to the target storage location in the second detection image if the second detection image includes the rack identification code; and determining the pose position relationship between the material handling apparatus and the target storage location based on an identification result.

Optionally, the image acquisition apparatus includes a first image acquisition apparatus and a second image acquisition apparatus, the first image acquisition apparatus and the second image acquisition apparatus are respectively arranged on two sides of the material handling apparatus, and the acquiring the first detection image through the image acquisition apparatus includes: respectively acquiring one first detection image through the first image acquisition apparatus and the second image acquisition apparatus, to obtain two first detection images; and correspondingly, the determining the pose position relationship between the target storage location and the material handling apparatus based on information of preset key points in the first detection image includes: identifying the rack identification code corresponding to the target storage location in the two first detection images respectively if the two first detection images both include the rack identification code, to obtain a first identification result and a second identification result; and determining the pose position relationship between the target storage location and the material handling apparatus based on the first identification result and the second identification result.

Optionally, the determining the pose position relationship between the target storage location and the material handling apparatus based on the first identification result and the second identification result includes: calculating a position average of points of the rack identification code in the first identification result and the second identification result, and an angle average of the identification pattern of the rack identification code in the first identification result and the second identification result; and determining the pose position relationship between the target storage location and the material handling apparatus based on the position average and the angle average.

Optionally, the determining the pose position relationship between the target storage location and the material handling apparatus based on the information of preset key points in the first detection image includes: determining positions of center points of the first supporting portion and the second supporting portion based on the first detection image, where the first supporting portion and the second supporting portion are configured to support goods placed at the target storage location; and determining the pose position relationship between the material handling apparatus and the target storage location based on the positions of the center points of the first supporting portion and the second supporting portion.

Optionally, the determining positions of center points of the first supporting portion and the second supporting portion based on the first detection image includes: determining a first distance between the first supporting portion and the second supporting portion based on the first detection image; and determining the position of the center point of the first supporting portion and the position of the center point of the second supporting portion in the first detection image based on the first distance and preset size information, where the preset size information is size information of the first supporting portion and/or the second supporting portion.

Optionally, the determining the pose position relationship between the material handling apparatus and the target storage location based on the positions of the center points of the first supporting portion and the second supporting portion includes: determining an angle deviation, a height deviation, and a path deviation of the material handling apparatus based on the positions of the center points of the first supporting portion and the second supporting portion.

Optionally, after the adjusting the material handling apparatus of the robot to be aligned with the target storage location, the method further includes: determining whether an image center of the image acquisition apparatus is aligned with a center of the target storage location; and if so, controlling the material handling apparatus to extend toward the target storage location, so as to retrieve and/or store target goods, where the target goods are corresponding goods in a dispatch instruction.

Optionally, the method further includes: acquiring a third detection image of a preset layer of a temporary storage rack of the robot through the image acquisition apparatus; determining positions of two preset points of the preset layer of the temporary storage rack based on the third detection image; determining a second angle deviation and a second height deviation between the material handling apparatus and the preset layer of the temporary storage rack based on the positions of the two preset points; determining, based on the second angle deviation and the second height deviation, whether the material handling apparatus is to collide with the temporary storage rack after the material handling apparatus extends toward the preset layer of the temporary storage rack; and if the material handling apparatus is not to collide with the temporary storage rack, controlling the material handling apparatus to place the target goods onto the preset layer of the temporary storage rack, or controlling the material handling apparatus to retrieve the target goods from the preset layer of the temporary storage rack so as to place the target goods to the target storage location after the material handling apparatus is aligned with the target storage location.

According to a second aspect, an embodiment of the present application further provides an adjustment apparatus for a material handling apparatus. The apparatus is adopted to a robot, an image acquisition apparatus is arranged on a material handling apparatus of the robot, and the apparatus includes: a first image acquisition module configured to acquire a first detection image through the image acquisition apparatus when the robot moves to a target ground identifier, where the target ground identifier is a ground identifier corresponding to a target storage location, and a supporting portion is arranged at the target storage location, where the supporting portion includes a first supporting portion and a second supporting portion at a same height to collaboratively place goods; a pose position determination module configured to determine a pose position relationship between the target storage location and the material handling apparatus based on preset key points in the first detection image, where the preset key points include points corresponding to a rack identification code and/or the supporting portions; and a material handling apparatus alignment module configured to adjust the material handling apparatus of the robot to be aligned with the target storage location based on the pose position relationship, so that an insert plate of the material handling apparatus is placed between the first supporting portion and the second supporting portion, so as to retrieve goods from the target storage location or place goods to the target storage location.

According to a third aspect, an embodiment of the present application further provides an adjustment device for a material handling apparatus, including a memory and at least one processor. The memory is configured to store computer-executable instructions. The at least one processor is configured to execute the computer-executable instructions stored in the memory, so that the at least one processor performs the adjustment method for the material handling apparatus provided in any embodiment corresponding to the first aspect of the present application.

According to a fourth aspect, an embodiment of the present application further provides a robot, including a material handling apparatus and an adjustment device for the material handling apparatus provided in the embodiment corresponding to the third aspect of the present application.

According to a fifth aspect, an embodiment of the present application further provides a warehousing system, including a rack and the robot provided in the embodiment corresponding to the fourth aspect of the present application.

According to a sixth aspect, an embodiment of the present application further provides a computer-readable storage medium. The computer-readable storage medium stores computer-executable instructions. When a processor executes the computer-executable instructions, the adjustment method for a material handling apparatus provided in any embodiment corresponding to the first aspect of the present application is performed.

According to a seventh aspect, an embodiment of the present application further provides a computer program product, including a computer program. When the computer program is executed by a processor, the adjustment method for a material handling apparatus provided in any embodiment corresponding to the first aspect of the present application is performed.

According to the adjustment method, apparatus, and device for a material handling apparatus, the robot, and the warehousing system provided in the embodiments of the present application, each storage location on a rack of the warehousing system is supported by a supporting portion. The supporting portion includes a first supporting portion and a second supporting portion at the same height to collaboratively place goods. When the robot performs the task of goods retrieval or storage, after the robot is in position, that is, after moving to the ground identifier corresponding to the target storage location, a first detection image is acquired through the image acquisition apparatus arranged on the material handling apparatus of the robot, and the pose position relationship between the target storage location and the image acquisition apparatus is determined based on each point corresponding to the rack identification code and/or the supporting portion in the first detection image. Then, based on the pose position relationship, the material handling apparatus of the robot is adjusted to be aligned with the target storage location, so that after alignment, the material handling apparatus can place an insert plate between the two supporting portions of the target storage location to retrieve or store goods. Before the robot retrieves or places the goods, the material handling apparatus of the robot is aligned with the target storage location, which avoids collisions during goods retrieval and storage and improves safety of goods retrieval and storage.

BRIEF DESCRIPTION OF THE DRAWINGS

The accompanying drawings herein are incorporated into the specification and constitute a part of the specification, illustrate embodiments that conform to the present application and are used together with the specification to explain the principles of the present application.

FIG. 5 is a flowchart of an adjustment method for a material handling apparatus according to another embodiment of the present application;

FIG. 6 is a schematic structural diagram of a rack in the embodiment shown in FIG. 5 according to the present application;

FIG. 8 is a flowchart of an adjustment method for a material handling apparatus according to another embodiment of the present application;

FIG. 9 is a flowchart of an adjustment method for a material handling apparatus according to another embodiment of the present application;

FIG. 10 is a schematic structural diagram of an adjustment apparatus for a material handling apparatus according to an embodiment of the present application;

Specific embodiments of the present application have been shown through the above accompanying drawings, and more detailed description is to be given below. These accompanying drawings and text description are not intended to limit the scope of the concept of the present application in any way, but to describe the concept of the present application for those skilled in the art with reference to the specific embodiments.

DETAILED DESCRIPTION

Exemplary embodiments are to be described herein in detail, and examples thereof are represented in the accompanying drawings. When the following description involves the accompanying drawings, unless otherwise indicated, the same numerals in different accompanying drawings represent the same or similar elements. The implementations described in the following exemplary embodiments do not represent all implementations consistent with the present application. On the contrary, the implementations are merely examples of apparatuses and methods consistent with some aspects of the present application as detailed in the appended claims. The words "and/or" mean "one or more of listed items".

The technical solutions of the present application and how the technical solutions of the present application resolve the above technical problems are described in detail below through the specific embodiments. The following several specific embodiments may be combined with each other, and the same or similar concepts or processes may not be described repeatedly in some embodiments. The embodiments of the present application are described below with reference to the accompanying drawings.

The application scenarios of the embodiments of the present application are described below.

Figure 1:
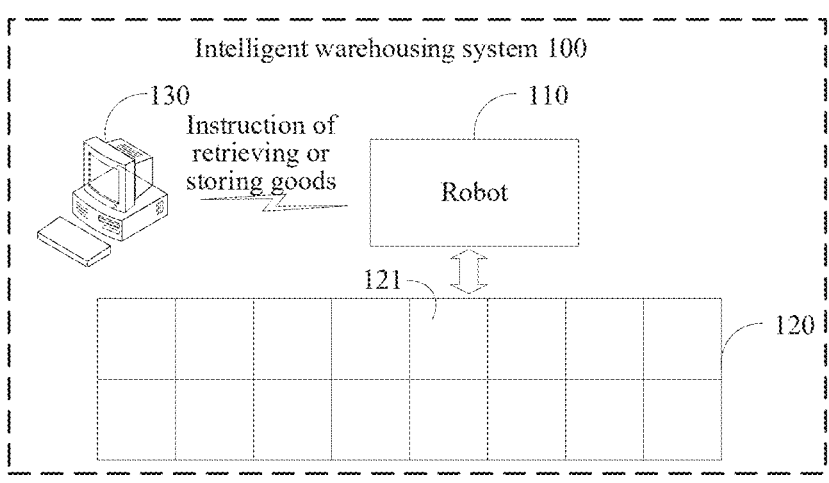
FIG. 1 is a diagram of an application scenario of an adjustment method for a material handling apparatus according to an embodiment of the present application.

FIG. 1 is a diagram of an application scenario of an adjustment method for a material handling apparatus according to an embodiment of the present application. As shown in FIG. 1, the adjustment method for the material handling apparatus provided in the embodiment of the present application may be run on an adjustment device of the material handling apparatus. An intelligent warehousing system 100 includes a robot 110, a rack 120, and a dispatch device 130. After receiving an instruction of retrieving or storing goods, the dispatch device 130 generates a dispatch instruction, so that the robot 110 retrieves the goods at a target storage location 121 or places the goods at a target storage location 121 based on the dispatch instruction.

In the prior art, after reaching a position corresponding to the target storage location 121, the robot 110 directly retrieves the goods at the target storage location 121, or directly place, onto the target storage location 121 of the shelving unit 120, the goods on the robot 110. However, due to a walking error of the robot 110, the error in placement of the goods, or other reasons, the robot 110 directly perform goods retrieval or storage operation without being aligned with the target storage location 121 during goods retrieval or storage, and the material handling apparatus of the robot 110 may collide with the shelving unit 120, causing losses. For a task of goods storage, the goods may not be placed in the center of the target storage location 121. For a cross-beam rack, a corbel-type rack, and the like, a storage location thereof is hollow and only consists of two separate supporting portions. When goods are improperly placed, the goods are prone to falling, causing losses.

In view of the above problems, in order to improve the safety of goods retrieval and storage by the robot, the main idea of the adjustment method for the material handling apparatus provided in the embodiment of the present application is as follows. Before goods retrieval or storage, a first detection image is acquired through an image acquisition apparatus arranged on the material handling apparatus of the robot. The pose position relationship between the target storage location and the image acquisition apparatus is determined based on information of each point corresponding to a rack identification code and/or the supporting portion in the image. Calibration between the target storage location and the material handling apparatus of the robot is realized based on the pose position relationship, and a corresponding task of retrieving or storing goods is performed after the calibration, thereby improving safety of goods retrieval and storage.

Figure 2:
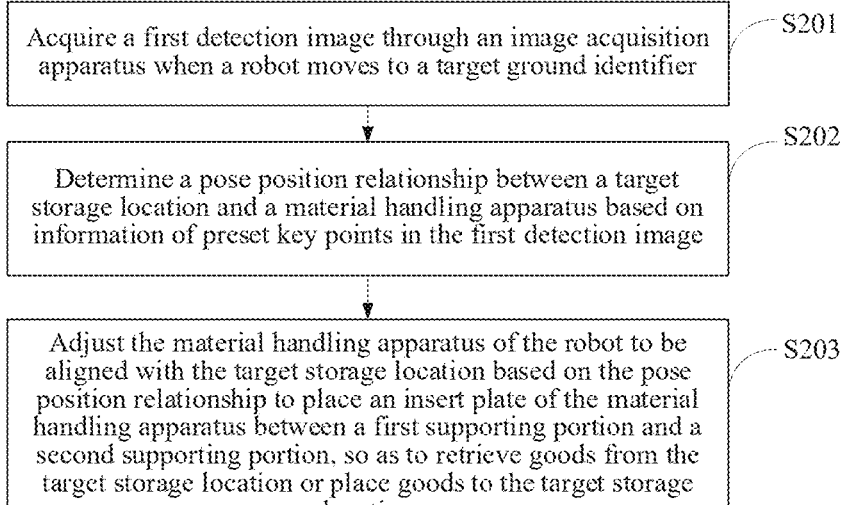
FIG. 2 is a flowchart of an adjustment method for a material handling apparatus according to an embodiment of the present application.

FIG. 2 is a flowchart of an adjustment method for the material handling apparatus according to an embodiment of the present application. As shown in FIG. 2, the adjustment method for the material handling apparatus may be performed by a robot. Specifically the adjustment method may be performed by an adjustment device of the material handling apparatus of the robot. An image acquisition apparatus is provided on the material handling apparatus of the robot. The adjustment method for the material handling apparatus provided in this embodiment includes the following steps.

Step S201: acquire a first detection image by using the image acquisition apparatus when the robot moves to a target ground identifier.

The target ground identifier is a ground identifier corresponding to a target storage location. A supporting portion is arranged at the target storage location, and the supporting portion includes a first supporting portion and a second supporting portion at a same height to collaboratively place goods. The image acquisition apparatus may be a 2D camera or a 3D camera, and the number of image acquisition apparatuses may be one, two, or another value. The image acquisition apparatus may be arranged on the left, right, middle, or another position of the material handling apparatus of the robot.

The target ground identifier may be in the form of a two-dimensional code, a bar code, or coding, or in another form. The robot may determine whether a current position is a position corresponding to the target storage location based on the target ground identifier. The first supporting portion and the second supporting portion are arranged on two sides of the target storage location, and there is a certain distance between the first supporting portion and the second supporting portion.

Figure 3:
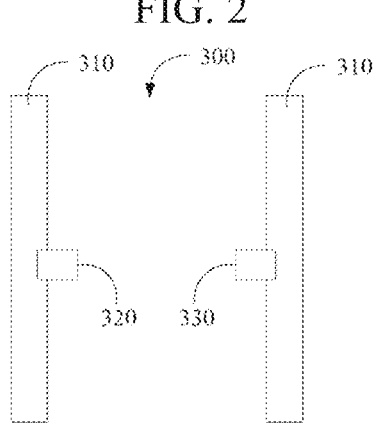
FIG. 3 is a schematic structural diagram of a storage location of a rack according to an embodiment of the present application.

For example, FIG. 3 is a schematic structural diagram of a storage location of a rack according to an embodiment of the present application. As shown in FIG. 3, a target storage location 300 is composed of rack columns 310, a first supporting portion 320, and a second supporting portion 330. A specific distance is formed between the first supporting portion 320 and the second supporting portion 330. That is to say, the middle part of the target storage location 300 is suspended, and goods placed at the target storage location 300 are supported by the first supporting portion 320 and the second supporting portion 330. The spacing distance corresponding to different racks may be different, and therefore the size of the target storage location 300 may be also different.

In some embodiments, the rack is a drive-in racking, and the supporting portion on the storage position of the rack may also be referred to as a corbel bracket.

Specifically, the robot may determine a target ground identifier and a movement path based on a dispatch instruction of the dispatch device, and then move from a current position to the target ground identifier based on the movement path. After the robot moves to the target ground identifier, the image acquisition apparatus on a material handling apparatus of the robot is turned on to acquire the first detection image within a field of view.

Further, during the movement of the robot to the target ground identifier, a movement route of the robot may be adjusted based on the movement path and a ground image acquired by the image acquisition apparatus until the robot reaches the target ground identifier.

Specifically, the dispatch device may determine the target storage location and its corresponding target ground identifier based on the task of goods retrieval or storage, then generate a dispatch instruction based at the target storage location and the corresponding target ground identifier. The dispatch device sends the dispatch instruction to the robot, so that the robot can move to the target ground identifier based on the dispatch instruction and perform the task of retrieving or storing goods at the target storage location.

Further, after the robot moves to the target ground identifier based on the dispatch instruction, the material handling apparatus of the robot is controlled to rotate by 90 degrees toward the target storage location, so that the material handling apparatus directly faces the target storage location. The image acquisition apparatus on the material handling apparatus is turned on to capture the first detection image corresponding to the target storage location.

Figure 4A:
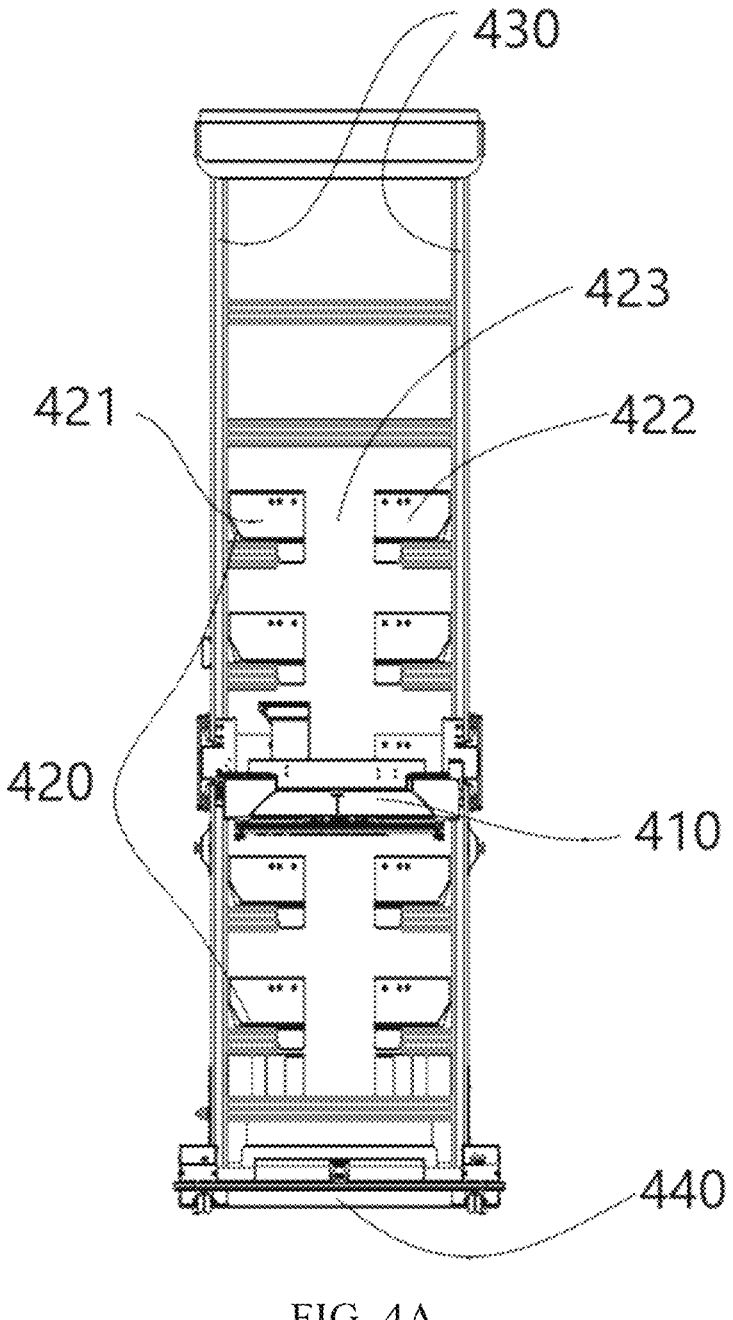
FIG. 4A is a schematic structural diagram of a robot according to an embodiment of the present application.

For example, FIG. 4A is a schematic structural diagram of a robot according to an embodiment of the present application. As shown in FIG. 4, the robot includes a material handling apparatus 410, a temporary storage rack 420, an elevator 430, and a chassis 440. The material handling apparatus 410 retrieves goods by forking and lifting. The temporary storage rack 420 is configured to temporarily store goods. The temporary storage rack 420 shown in FIG. 4A is a stepped rack, including five layers. Each layer is composed of a left shelf 421 and a right shelf 422, and an opening 423 exists between the left shelf 421 and the right shelf 422. The elevator 430 is configured to move the material handling apparatus 410 to each layer of the temporary storage rack 420 of the robot.

Figure 4B:
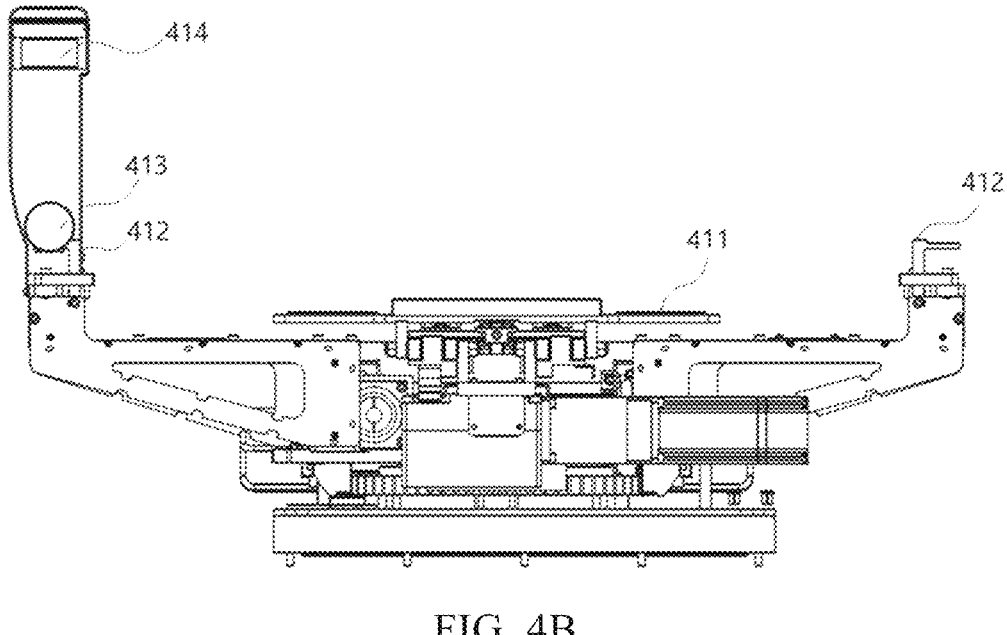
FIG. 4B is a schematic structural diagram of a material handling apparatus of a robot according to an embodiment of the present application.
Figure 4C:
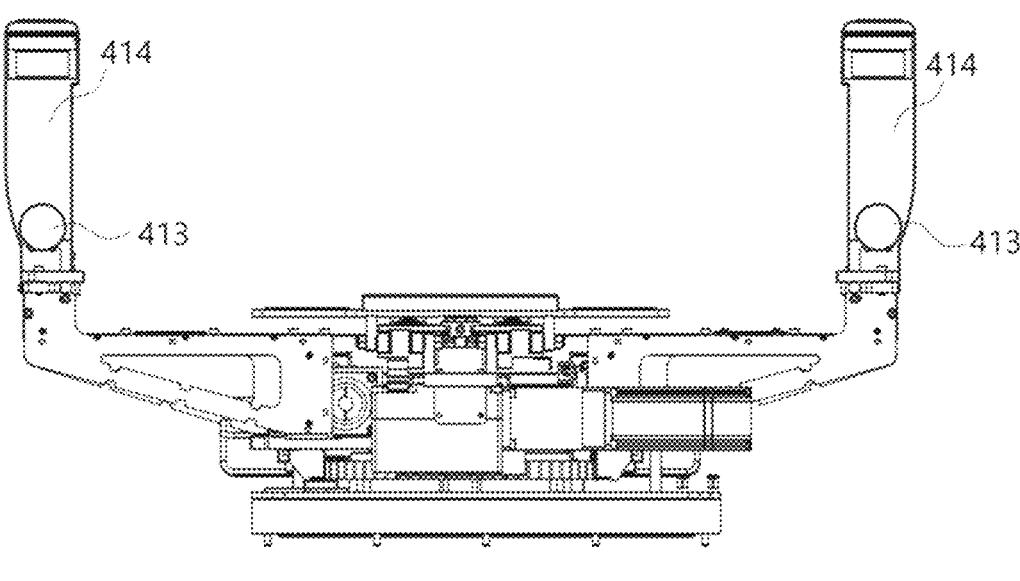
FIG. 4C is a schematic structural diagram of a material handling apparatus of a robot according to another embodiment of the present application.
Figure 4D:
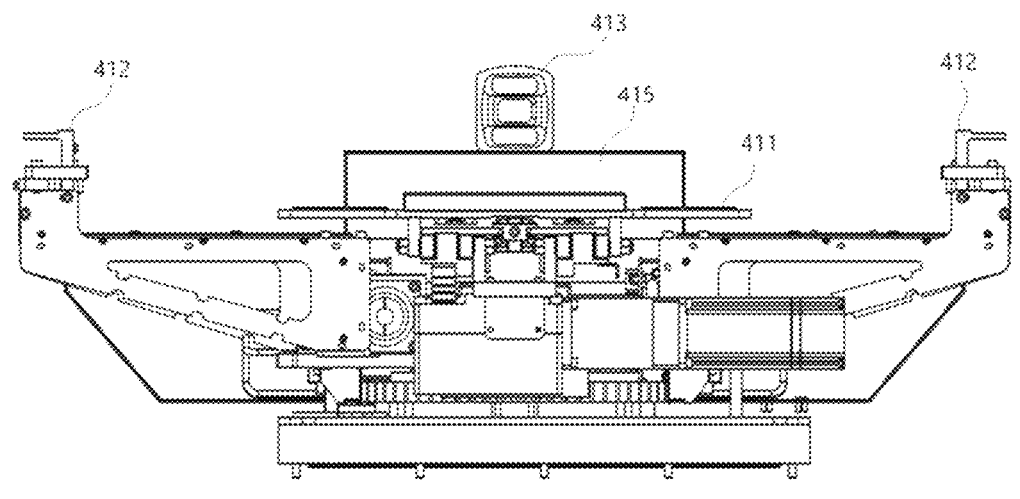
FIG. 4D is a schematic structural diagram of a material handling apparatus of a robot according to another embodiment of the present application.

For example, FIG. 4B is a schematic structural diagram of a material handling apparatus of a robot according to an embodiment of the present application. As shown in FIG. 4B, the material handling apparatus 410 includes an insert plate 411, fixed side stops 412, an image acquisition apparatus 413 arranged on the fixed side stops 412, and a lighting device 414 of the image acquisition apparatus 413. In FIG. 4B, the number of image acquisition apparatuses 413 is one, which is mounted to one of the fixed side stops 412. FIG. 4C is a schematic structural diagram of a material handling apparatus of a robot according to another embodiment of the present application. It may be learned with reference to FIG. 4B and FIG. 4C that, different from FIG. 4B, the number of image acquisition apparatuses 413 in FIG. 4C is two, and a lighting device 414 is arranged above each image acquisition apparatus 413. The image acquisition apparatus in FIG. 4B and FIG. 4C may be a 2D camera. FIG. 4D is a schematic structural diagram of a material handling apparatus of a robot according to another embodiment of the present application. It may be learned with reference to FIG. 4B and FIG. 4D that, different from FIG. 4B, the image acquisition apparatus 413 in FIG. 4D is arranged on a rear fixed stop 415, and the image acquisition apparatus 413 in FIG. 4D may be a 3D camera.

Figure 4E:
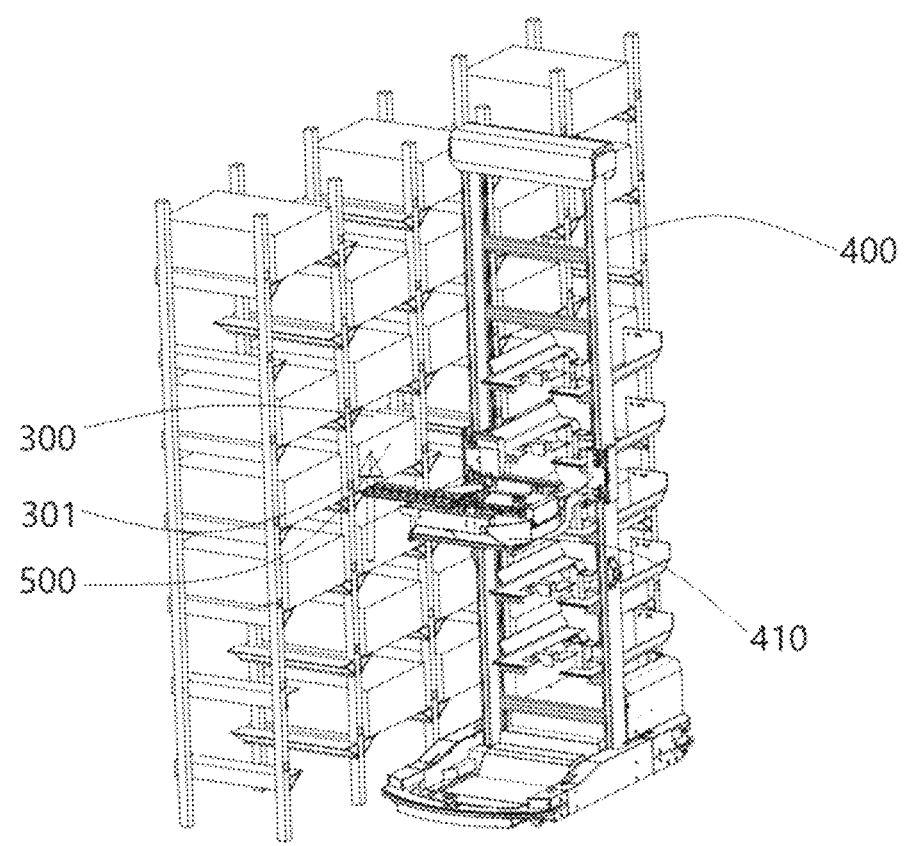
FIG. 4E is a schematic diagram showing goods retrieval by forking and lifting according to an embodiment of the present application.
Figure 4F:
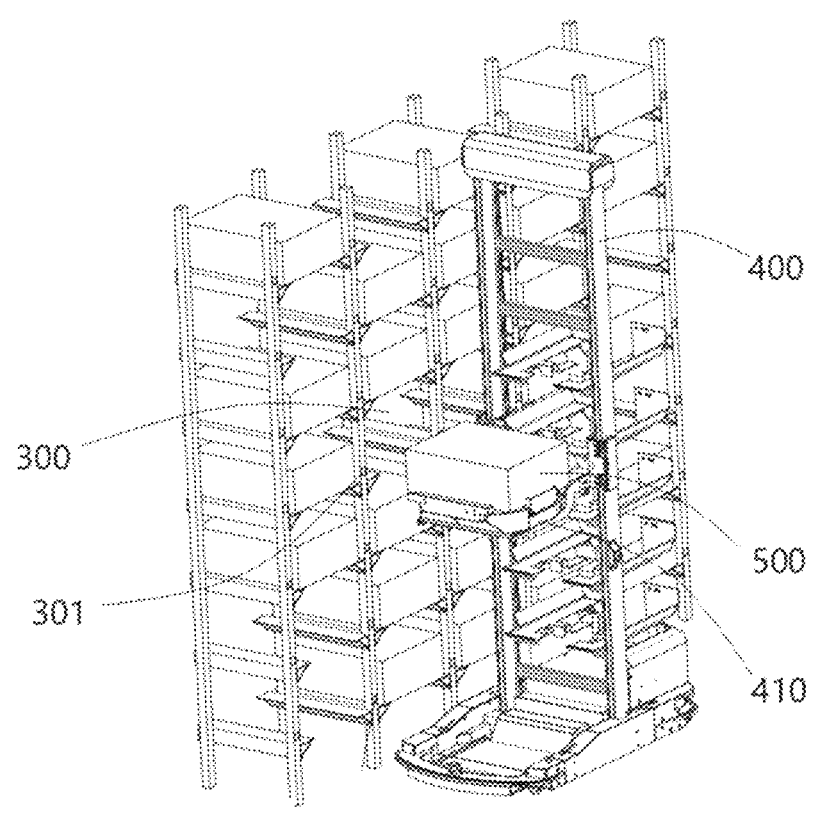
FIG. 4F is a schematic diagram showing goods retrieval by forking and lifting according to an embodiment of the present application.

For example, FIG. 4E and FIG. 4F are schematic diagrams showing goods retrieval by forking and lifting according to an embodiment of the present application. It may be learned with reference to FIG. 4E and FIG. 4F, during retrieval of target goods 500 at a target storage location 300, a robot 400 aligns a material handling apparatus 410 of the robot 400 with the target storage location 300 through a rack identification code 301 of the target storage location 300. Then, as shown in FIG. 4E, the robot 400 controls the material handling apparatus 410 thereof to extend toward the target storage location 300, and places the insert plate of the material handling apparatus 410 in a location beneath the target goods 500. The robot 400 controls the insert plate of the material handling apparatus 410 to move upward until the target goods 500 are lifted. After the material handling apparatus 410 lifts the target goods 500, as shown in FIG. 4F, the robot 400 controls the material handling apparatus 410 thereof to retract, resulting in taking the target goods 500 out of the target storage location 300.

Step S202: Determine a pose position relationship between the target storage location and the material handling apparatus based on information of preset key points in the first detection image.

The preset key points include points corresponding to the rack identification code and/or the supporting portions. The rack identification code is provided on a rack column corresponding to the target storage location. The rack identification code may be in the form of a two-dimensional code, a bar code, or another identification code including an identification pattern. The pose position relationship may include position relationships between the target storage location and the material handling apparatus in a transverse direction, a vertical direction, and a depth direction, and may further include an angle relationship between the material handling apparatus and the target storage location.

Specifically, the pose position relationship between the target storage location and the material handling apparatus may be determined based on a position of each preset key point in the first detection image.

Optionally, the rack identification code is arranged on a rack column corresponding to the target storage location, and the step of determining the pose position relationship between the target storage location and the material handling apparatus based on the information of preset key points in the first detection image includes:

identifying a rack identification code corresponding to the target storage location based on the first detection image; and determining the pose position relationship between the material handling apparatus and the target storage location based on an identification result if the identification succeeds.

Specifically, when the first detection image includes the rack identification code corresponding to the target storage location, the rack identification code may be identified and decoded to determine the position of each preset key point on the rack identification code. The pose position relationship between the target storage location and the image acquisition apparatus is then determined based on the position of each preset key point on the rack identification code.

Further, the pose position relationship between the image acquisition apparatus and the target storage location is determined based on the information of the preset key points in the first detection image. A first position relationship between the image acquisition apparatus and the material handling apparatus is determined based on a mounting position of the image acquisition apparatus, and then the pose position relationship between the material handling apparatus and the target storage location is determined based on the first position relationship and the pose position relationship between the image acquisition apparatus and the target storage location.

Optionally, the step of determining the pose position relationship between the target storage location and the material handling apparatus based on the information of preset key points in the first detection image includes:

determining positions of center points of the first supporting portion and the second supporting portion based on the first detection image, where the first supporting portion and the second supporting portion are configured to support goods placed at the target storage location; and determining the pose position relationship between the material handling apparatus and the target storage location based on the positions of the center points of the first supporting portion and the second supporting portion.

Specifically, the first supporting portion and the second supporting portion are arranged on two opposite sides of the target storage location and spaced apart by a specific distance. Positions of center points of the first supporting portion and the second supporting portion may be identified through the first detection image, and the pose position relationship between the material handling apparatus and the target storage location may be determined based on the positions of the center points of the first supporting portion and the second supporting portion.

Step S203: Adjust the material handling apparatus of the robot to be aligned with the target storage location based on the pose position relationship, so that the insert plate of the material handling apparatus is placed between the first supporting portion and the second supporting portion, so as to retrieve goods from the target storage location or place goods to the target storage location.

Specifically, the position of the material handling apparatus of the robot may be adjusted based on each deviation between the image acquisition apparatus and the target storage location in the corresponding pose position relationship, including an angle deviation and a position deviation, so that the material handling apparatus is aligned with the target storage location.

Specifically, after the material handling apparatus is aligned with the target storage location, the insert plate of the material handling apparatus is controlled to extend and to be placed between the first supporting portion and the second supporting portion, so as to complete retrieval of goods from the target storage location, or place goods on the target storage location, resulting in completing the task of retrieving and storing goods.

According to the adjustment method for the material handling apparatus provided in this embodiment of the present application, each storage location on a rack of the warehousing system focused by the method is supported by a supporting portion. The supporting portion includes a first supporting portion and a second supporting portion at the same height to collaboratively place goods. When the robot performs the task of goods retrieval or storage, after the robot is in position, that is, after the robot moves to the ground identifier corresponding to the target storage location, the first detection image is acquired through the image acquisition apparatus arranged on the material handling apparatus of the robot. The pose position relationship between the target storage location and the material handling apparatus is determined based on the information of each point corresponding to the rack identification code and/or the supporting portion in the first detection image. Then, based on the pose position relationship, the material handling apparatus of the robot is adjusted to be aligned with the target storage location, so that after alignment, the material handling apparatus can place the insert plate between the two supporting portions of the target storage location to retrieve or store goods. Before the robot retrieves and places the goods, the material handling apparatus of the robot is aligned with the target storage location, which avoids collisions during goods retrieval and storage and improves safety of goods retrieval and storage.

In some embodiments, when the robot retrieves goods from the temporary storage rack of the robot or places goods to the temporary storage rack of the robot, it is also necessary to determine whether the material handling apparatus of the robot is to collide with the temporary storage rack of the robot. If the material handling apparatus will not collide with the temporary storage rack, an operation of goods retrieval or storage is performed.

Optionally, if the dispatch instruction is a goods storage instruction, that is, the robot needs to store the target goods at the target storage location, the method further includes: acquiring a third detection image of a preset layer of the temporary storage rack of the robot through the image acquisition apparatus; determining positions of two preset points of the preset layer of the temporary storage rack based on the third detection image; determining a second angle deviation and a second height deviation between the material handling apparatus and the preset layer of the temporary storage rack based on the positions of the two preset points; determining, based on the second angle deviation and the second height deviation, whether the material handling apparatus is to collide with the temporary storage rack after the material handling apparatus extends toward the preset layer of the temporary storage rack; and if the material handling apparatus is not to collide with the temporary storage rack, controlling the material handling apparatus to retrieve the target goods from the preset layer of the temporary storage rack, so as to place the target goods to the target storage location after the material handling apparatus is aligned with the target storage location.

Optionally, if the dispatch instruction is a goods retrieval instruction, that is, the robot needs to retrieves the target goods from the target storage location, after the material handling apparatus is aligned with the target storage location and the target goods are retrieved, the method further includes: acquiring a third detection image of a preset layer of the temporary storage rack of the robot through the image acquisition apparatus; determining positions of two preset points of the preset layer of the temporary storage rack based on the third detection image; determining a second angle deviation and a second height deviation between the material handling apparatus and the preset layer of the temporary storage rack based on the positions of the two preset points; determining, based on the second angle deviation and the second height deviation, whether the material handling apparatus is to collide with the temporary storage rack after the material handling apparatus extends toward the preset layer of the temporary storage rack; and if the material handling apparatus is not to collide with the temporary storage rack, controlling the material handling apparatus to place the target goods onto the preset layer of the temporary storage rack.

The temporary storage rack of the robot is configured to temporarily store the goods during transfer or transport of the goods by the robot. The temporary storage rack may include only one layer, or may include a plurality of layers. Two preset points of the preset layer may be two points symmetrically arranged with respect to the center of the preset layer, or may be two points of an opening corresponding to the preset layer which are symmetrical with respect to the center, such as two points on edges of a left shelf and a right shelf of the preset layer.

Specifically, when the robot executes the goods storage instruction, after the robot moves to the target ground identifier, the robot needs to retrieves the target goods placed on the preset layer of the temporary storage rack of the robot through the material handling apparatus thereof, and then place the target goods onto the target storage location after the material handling apparatus is aligned with the target storage location.

Further, before the material handling apparatus retrieves the target goods from the preset layer of the temporary storage rack of the robot, it is necessary to determine the positions of two symmetrically arranged preset points of the preset layer through a third detection image of the preset layer of the temporary storage rack of the robot that is acquired by the image acquisition apparatus arranged on the material handling apparatus, so as to perform fool-proof determination based on the positions of the two preset points. Specifically, it may be determined based on the second angle deviation and the second height deviation between the material handling apparatus and the preset layer of the temporary storage rack whether the material handling apparatus is to collide with the temporary storage rack after extending toward the preset layer of the temporary storage rack, and if not, the material handling apparatus may be controlled to retrieve the target goods placed on the preset layer.

Specifically, when the robot executes the goods retrieval instruction, after the material handling apparatus is aligned with the target storage location, the robot needs to retrieve the target goods placed on the target storage location through the material handling apparatus thereof. Specifically, the target goods are retrieved by forking and lifting, and the target goods are then placed on the preset layer of the temporary storage rack of the robot.

Further, before the target goods are placed on the preset layer of the temporary storage rack of the robot, it is necessary to determine the positions of two symmetrically arranged preset points of the preset layer through a third detection image of the preset layer of the temporary storage rack of the robot that is acquired by the image acquisition apparatus arranged on the material handling apparatus, so as to perform fool-proof determination based on the positions of the two preset points. Specifically, it may be determined based on the second angle deviation and the second height deviation between the material handling apparatus and the preset layer of the temporary storage rack whether the material handling apparatus is to collide with the temporary storage rack after extending toward the preset layer of the temporary storage rack, and if not, the material handling apparatus may be controlled to place the target goods onto the preset layer of the temporary storage rack of the robot.

In the embodiment provided in the present application, the alignment of the material handling apparatus of the robot can be performed through the first detection image, so that it does not need to provide a machine readable identification code on the goods in the warehousing system, including the target goods, thereby reducing the cost. It is not necessary to paste the identification code for each goods before storage of goods, which improves storage efficiency of goods.

FIG. 5 is a flowchart of an adjustment method for the material handling apparatus according to another embodiment of the present application. In this embodiment, a rack identification code is provided on a rack column corresponding to a target storage location of a warehousing system. The adjustment method for the material handling apparatus provided in this embodiment is a further refinement of step S202 and step S203 based on the embodiment shown in FIG. 2. As shown in FIG. 5, the adjustment method for the material handling apparatus provided in this embodiment includes the following steps.

Step S501: Acquire a first detection image by using the image acquisition apparatus when the robot moves to a target ground identifier.

Step S502: Identify a rack identification code corresponding to the target storage location based on the first detection image.

The rack identification code corresponding to the target storage location is provided on any one rack column within the target storage location.

Specifically, in this embodiment, each storage location on the rack of the warehousing system corresponds to a rack identification code.

For example, FIG. 6 is a schematic structural diagram of a rack in the embodiment shown in FIG. 5 according to the present application. As shown in FIG. 6, a rack identification code 612 is provided on a rack column 611 of a rack 610, and a rack identification code 622 is provided on the rack column 621 of the rack 620. Each storage location corresponds to a rack identification code. Identification patterns of the rack identification codes corresponding to different storage locations may be the same or different. In FIG. 6, as an example, the identification pattern on the rack identification code is an L-shaped pattern. Widths D of the goods stored on the storage locations corresponding to different racks may be different, and sizes of the supporting portions may also be different. In FIG. 6, the storage location of the rack 610 is a small storage location, sizes of supporting portions 613 of the rack are relatively small, and a distance between the two supporting portions 613 is also correspondingly small. However, the storage location of the rack 620 is a large storage location, sizes of supporting portions of the rack are relatively large, and a distance between the two supporting portions 623 is also correspondingly large. The identification pattern of the rack identification code shown in FIG. 6 is only used as an example, and the identification pattern may also be another pattern with identification characteristics, which is not limited in the present application.

Specifically, when the first detection image includes the identification pattern of the rack identification code, the identification pattern is identified, thereby obtaining the identification result.

Specifically, the identification result may include an orientation of the identification pattern of the rack identification code, position information of each feature point in the identification pattern, and the like.

Step S503: If the identification succeeds, determine an angle deviation, a height deviation, and a path deviation of the material handling apparatus based on position information of feature points of the rack identification code and angle information of the identification pattern of the rack identification code.

The path deviation is a deviation between an image center of the image acquisition apparatus and a storage location center of the target storage location. When the path deviation is 0 or a preset deviation, it indicates that an image center of the image acquisition apparatus coincides with a storage location center of the target storage location. The feature point of the rack identification code may be an inflection point of the identification pattern of the rack identification code, and may further include other feature points of the identification pattern. Through the position information of the feature point, the orientation or angle of the identification pattern may be determined, and the position of the identification pattern may further be determined.

Specifically, after the rack identification code is successfully identified, that is, after the position information of the feature point on the identification pattern of the rack identification code and the angle information of the identification pattern are obtained, a pose position relationship between the image acquisition apparatus and the target storage location is determined based on the position information of the feature points of the rack identification code and the angle information of the identification pattern of the rack identification code. The pose position relationship includes the angle deviation, the height deviation, and the path deviation of the image acquisition apparatus relative to the target storage location, and may further include a depth deviation of the image acquisition apparatus relative to the target storage location.

Figure 7A:
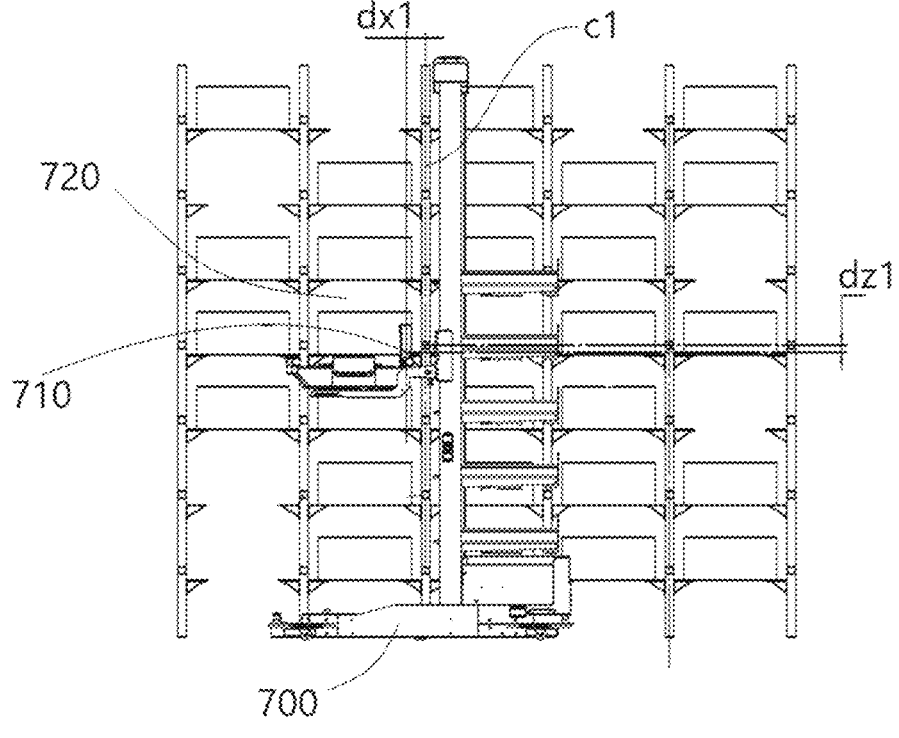
FIG. 7A is a schematic diagram of a pose position relationship between an image acquisition apparatus and a target storage location in the embodiment shown in FIG. 5 according to the present application.
Figure 7B:
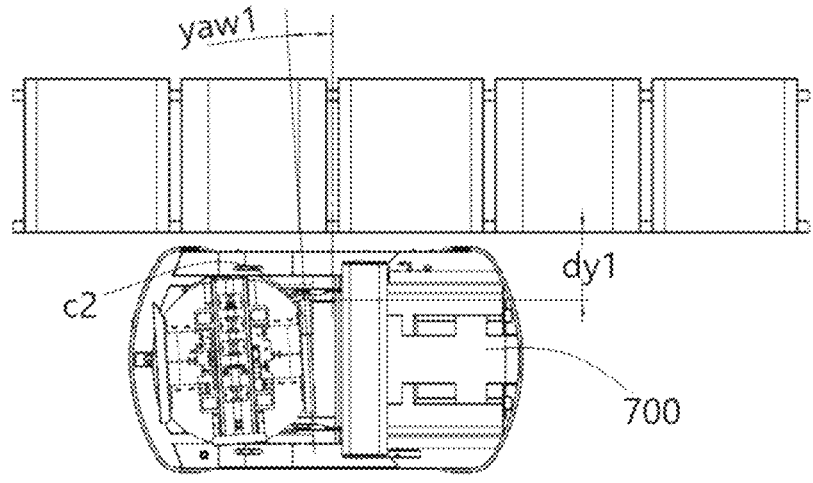
FIG. 7B is a schematic diagram of a pose position relationship between an image acquisition apparatus and a target storage location in the embodiment shown in FIG. 5 according to the present application.

For example, FIG. 7A and FIG. 7B are schematic diagrams of a pose position relationship between an image acquisition apparatus and a target storage location in the embodiment shown in FIG. 5 according to the present application. With reference to FIG. 7A and FIG. 7B, it may be learned that a pose position relationship between an image acquisition apparatus 710 of a robot 700 and a target storage location 720 includes an angle deviation yaw1, a height deviation dz1, a depth deviation dy1, and a path deviation dx1 of the image acquisition apparatus 710 relative to the target storage location 720. The height deviation dz1 is a deviation in a height direction between the image acquisition apparatus 710 and a rack identification code 721 corresponding to the target storage location 720. The path deviation dx1 is a deviation in a horizontal direction between the image acquisition apparatus 710 and a center line c1 of the rack identification code corresponding to the target storage location 720. The depth deviation dy1 is a distance in a depth direction between a center line c2 of the image acquisition apparatus 710 on the robot 700 and the rack identification code corresponding to the target storage location 720. The angle deviation yaw1 is an angle deviation between an orientation of the robot 700 and an orientation of the target storage location 720.

Further, after it is determined that the angle deviation yaw1, the height deviation dz1, the depth deviation dy1, and the path deviation dx1 of the image acquisition apparatus relative to the target storage location, it is determined whether the angle deviation yaw1, the height deviation dz1, the depth deviation dy1, and the path deviation dx1 are all within a preset threshold. If so, the subsequent step, that is, step S507, continues to be performed. If not, the result is reported to the system for early warning of abnormality, so as to detect the abnormality of the target storage location, the ground identifier, the robot, and the like.

Step S504: Adjust the image acquisition apparatus within a preset range and acquire at least one second detection image during adjustment and/or upon completion of the adjustment if the rack identification code corresponding to the target storage location is not identified from the first detection image.

The preset range may be a set range.

Specifically, the situation of not identifying the rack identification code corresponding to the target storage location from the first detection image may include that the first detection image does not include a complete and whole identification pattern. In this case, the rack identification code corresponding to the target storage location cannot be recognized based on the first detection image, that is, the identification of the rack identification code fails. Therefore, it needs to adjust the image acquisition apparatus arranged on the material handling apparatus, so as to enlarge the field of view of the image acquisition apparatus and search for the rack identification code.

Specifically, controlling the image acquisition apparatus to move within a preset range may be controlling the image acquisition apparatus to move based on a set movement mode, and each second detection image is acquired during the movement.

Further, the image acquisition apparatus is controlled to move within a preset range. The image acquisition apparatus may move to the left and right for a specific distance and then move up and down for a specific distance, and continuously acquire each second detection image during the movement. Alternatively, the image acquisition apparatus may acquire the second detection image after moving to a target position, for example, after moving to the leftmost position.

Further, if the complete and whole identification pattern of the rack identification code is still not included in each second detection image after adjusting the image acquisition apparatus within the preset range, first pre-warning information is generated, so as to report to the warehousing system that the rack identification code is not found and request manual intervention.

Step S505: if the second detection image includes the rack identification code corresponding to the target storage location, identify the rack identification code in the second detection image.

Specifically, the specific manner of identifying the rack identification code in the second detection image is similar to the specific manner in the step S502, except that the first detection image is replaced with the second detection image. The details are not described herein again.

Step S506: Determine a pose position relationship between the material handling apparatus and the target storage location based on an identification result.

Specifically, an angle deviation, a height deviation, a depth deviation, and a path deviation of the material handling apparatus relative to the target storage location are determined based on position information of feature points of the rack identification code corresponding to the second detection image and angle information of an identification pattern of the rack identification code.

Specifically, the determining the pose position relationship between the material handling apparatus and the target storage location based on an identification result corresponding to the second detection image is similar to the specific step of determining the pose position relationship between the image acquisition apparatus and the target storage location based on an identification result corresponding to the first detection image, that is, similar to the step S503, except that the identification result corresponding to the first detection image is replaced by the identification result corresponding to the second detection image. The details are not described herein again.

Step S507: Determine a storage location type of the target storage location.

The storage location type of the target storage location may be determined based on the distance between two supporting portions corresponding to the target storage location. Alternatively, the storage location type of the target storage location may be determined based on the size of the target goods that can be stored or placed in the target storage location, for example, it may be determined based on the width of the target goods. As an illustrating example, the storage location type may include a small storage location type and a large storage location type.

Specifically, the storage location type of the target storage location may be determined based on the dispatch instruction, such as the goods retrieval instruction or the goods storage instruction.

Further, the storage location type of the target storage location may be determined based on a first correspondence and a storage location identifier of the target storage location in the dispatch instruction. The first correspondence is used to describe a correspondence between each storage location identifier and the storage location type.

Step S508: Determine a preset deviation based on the storage location type of the target storage location.

The preset deviation is used to describe a distance between the center of the rack identification code of the target storage location and the storage location center of the target storage location.

Specifically, storage locations with different storage location types correspond to different preset deviations. The preset deviation may be determined based on the first correspondence and the storage location type of the target storage location.

For example, Table 1 is the first correspondence table in the embodiment shown in FIG. 5 of the present application. As shown in Table 1, the storage location types include two types: a small storage location type and a large storage location type. The preset deviation corresponding to the small storage location type is a, and the preset deviation corresponding to the large storage location type is b, where b>a.

TABLE 1

| First correspondence table | | |
| --- | --- | --- |
| Storage location identifier | Storage location type | Preset deviation |
| L1 | Small storage location | a |
| L2 | Large storage location | b |

Specifically, the preset deviation may be determined based on a second correspondence and the storage location type of the target storage location. The second correspondence is used to describe a correspondence between various storage location types and the preset deviation.

In some embodiments, step S507 and step S508 may be performed first, and then step S501 is performed. Alternatively, step S501 and step S507 are performed in parallel. Alternatively, step S507 and step S508 may be performed before, after, or when any of steps S501 to S506 is performed.

Step S509: Adjust the material handling apparatus based on the preset deviation, so as to adjust the path deviation to the preset deviation, and respectively adjust an angle and a height of the material handling apparatus based on the angle deviation and the height deviation, so that the material handling apparatus is aligned with the target storage location.

Specifically, after the preset deviation is determined, by adjusting the position and the angle of the material handling apparatus, the path deviation dx1 of the image acquisition apparatus relative to the target storage location is the preset deviation, the angle deviation yawl is 0, and the height deviation dz1 is a preset height, so that after the material handling apparatus extends, an insert plate of the material handling apparatus is lower than the corresponding height of a supporting surface of the supporting portion of the target storage location.

Further, an extension distance by which the material handling apparatus extends may further be determined based on the depth deviation dy1 of the image acquisition apparatus relative to the target storage location, so that after the material handling apparatus is aligned with the target storage location, the insert plate of the material handling apparatus can be controlled to extend based on the extension distance. The target goods at the target storage location can be retrieved by forking through the insert plate, or the target goods can be placed at the target storage location through the insert plate.

In this embodiment, for the warehousing system provided with a rack identification code on a rack column corresponding to the target storage location, after the robot moves to the target ground identifier corresponding to the target storage location, the first detection image of the target storage location is acquired by the image acquisition apparatus arranged on the material handling apparatus of the robot, and it is determined based on the first detection image whether the identification pattern of the complete and whole rack identification code can be read. If not, the image acquisition apparatus is adjusted to expand the field of view, and a plurality of second detection images are acquired until a complete and whole identification pattern of the rack identification code is read. Then, the pose position relationship between the image acquisition apparatus and the target storage location is determined based on the angle information of the identification pattern of the rack identification code and the position information of each feature point on the identification pattern. The pose position relationship includes the angle deviation, the height deviation, the path deviation, and the depth deviation. Then, the automatic alignment between the material handling apparatus and the target storage location is realized based on the pose position relationship. Goods retrieval/storage based on the aligned material handling apparatus improves the safety of retrieving and storing goods and avoids collision.

FIG. 8 is a flowchart of an adjustment method for the material handling apparatus according to another embodiment of the present application. The material handling apparatus of the robot in this embodiment is provided with two image acquisition apparatuses, that is, a first image acquisition apparatus and a second image acquisition apparatus, which are respectively arranged on two sides of the material handling apparatus. The adjustment method for the material handling apparatus provided in this embodiment is a further refinement of step S201 and step S202 based on the embodiment shown in FIG. 2. As shown in FIG. 8, the adjustment method for the material handling apparatus provided in this embodiment includes the following steps.

Step S801: Respectively acquire one first detection image by using a first image acquisition apparatus and a second image acquisition apparatus when the robot moves to a target ground identifier, to obtain two first detection images.

Specifically, when the robot moves to the target ground identifier corresponding to the target storage location, the first image acquisition apparatus and the second image acquisition apparatus arranged on the material handling apparatus of the robot is controlled to respectively acquire one first detection image, thereby obtaining two first detection images.

Step S802: If the two first detection images both include the rack identification code, identify the rack identification code corresponding to the target storage location in the two first detection images respectively, to obtain a first identification result and a second identification result.

Specifically, if the first detection images acquired by the first image acquisition apparatus and the second image acquisition apparatus both include the rack identification code, the rack identification code is respectively identified in the two acquired first detection images to obtain the first identification result corresponding to the first image acquisition apparatus and the second identification result corresponding to the second image acquisition apparatus. The first identification result and the second identification result may include the position information of each feature point of the identification pattern of the rack identification code in the corresponding first detection image and the angle information of the identification pattern.

Further, if only one of the two first detection images includes the rack identification code corresponding to the target storage location, the method provided in the embodiment shown in FIG. 5 is adopted to perform subsequent steps related to the identification of the rack identification code and the alignment of the material handling apparatus.

Step S803: Determine a pose position relationship between the target storage location and the material handling apparatus based on the first identification result and the second identification result.

Specifically, a first pose position relationship between the first image acquisition apparatus and the target storage location may be determined based on the position information of each feature point of the identification pattern of the rack identification code and the angle information of the identification pattern in the first identification result. A second pose position relationship between the second image acquisition apparatus and the target storage location may be determined based on the position information of each feature point of the identification pattern of the rack identification code and the angle information of the identification pattern in the second identification result. The pose position relationship between the material handling apparatus and the target storage location is determined based on the first pose position relationship and the second pose position relationship.

Further, first deviations between the material handling apparatus and the target storage location may be determined based on the first pose position relationship. The first deviations include a first angle deviation, a first height deviation, and a first path deviation between the material handling apparatus and the target storage location. Second deviations between the material handling apparatus and the target storage location may be determined based on the second pose position relationship. The second deviations include a second angle deviation, a second height deviation, and a second path deviation between the material handling apparatus and the target storage location. It is determined whether a difference between each of the first deviations and each of the second deviations is greater than a corresponding preset difference, and if so, second early warning information is generated so as to report to the system and request manual inspection of each relevant device. If not, the pose position relationship between the material handling apparatus and the target storage location is determined based on the first pose position relationship and the second pose position relationship. Specifically, the angle deviation, the height deviation, the path deviation, and the depth deviation between the material handling apparatus and the target storage location are determined based on the first angle deviation, the first height deviation, the first path deviation, and the first depth deviation in the first pose position relationship, and the second angle deviation, the second height deviation, the second path deviation, and the second depth deviation in the second pose position relationship.

Optionally, the step of determining the pose position relationship between the target storage location and the material handling apparatus based on the first identification result and the second identification result includes: calculating a position average of the points of the rack identification code in the first identification result and the second identification result, and an angle average of the identification pattern of the rack identification code in the first identification result and the second identification result; and determining the pose position relationship between the target storage location and the material handling apparatus based on the position average and the angle average.

Specifically, when the first identification result and the second identification result meet a preset condition, a position average of each point of the rack identification code and an angle average of the identification pattern of the rack identification code in the first identification result and the second identification result are calculated.

The situation that the first identification result and the second identification result meet a preset condition includes: a difference between a corresponding first deviation in the first identification result and a corresponding second deviation in the second identification result is less than or equal to a corresponding preset difference.

Step S804: Adjust the material handling apparatus of the robot to be aligned with the target storage location based on the pose position relationship, so that an insert plate of the material handling apparatus is placed between the first supporting portion and the second supporting portion, so as to retrieve goods from the target storage location or place goods to the target storage location.

In this embodiment, two image acquisition apparatuses are arranged on the material handling apparatus of the robot in the warehousing system, and each storage location of racks in the warehousing system corresponds to a rack identification code. The rack identification code is arranged on a rack column. When the robot moves to a position corresponding to the dispatch instruction, the first image acquisition apparatus and the second image acquisition apparatus are turned on to acquire a first detection image corresponding to the target storage location respectively. Then, the pose position relationship between the material handling apparatus and the target storage location is determined through the information corresponding to the rack identification code in the two first detection images. By adopting two image acquisition apparatuses, the field of view for acquisition is enlarged, and efficiency of identifying the rack identification code is improved. Moreover, the accuracy of determining the pose position relationship is improved by determining the pose position relationship through the two first detection images. The alignment of the material handling apparatus is performed based on the pose position relationship, which improves the alignment accuracy of the material handling apparatus and further improves the safety of goods retrieval and storage.

FIG. 9 is a flowchart of an adjustment method for the material handling apparatus according to another embodiment of the present application. The material handling apparatus in this embodiment includes a 3D camera or a 2D camera with a wide field of view. The adjustment method for the material handling apparatus provided in this embodiment is a further refinement of step S202 and step S203 based on the embodiment shown in FIG. 2. As shown in FIG. 9, the adjustment method for the material handling apparatus provided in this embodiment includes the following steps.

Step S901: Acquire a first detection image by using the image acquisition apparatus when the robot moves to a target ground identifier.

Step S902: Determine a first distance between a first supporting portion and a second supporting portion based on the first detection image.

Specifically, the first supporting portion and the second supporting portion of the target storage location are spaced apart by a specific distance, that is, the first distance as described above. Through the first detection image and a preset image identification algorithm, the first supporting portion and the second supporting portion may be identified, and then the first distance between the first supporting portion and the second supporting portion can be determined.

Further, the first detection image is point cloud data captured by a 3D camera. After the first detection image is acquired, the first detection image further needs to be preprocessed. The preprocessing includes noise reduction and segmentation, and then the first distance between the first supporting portion and the second supporting portion is determined based on the preprocessed first detection image.

Step S903: Determine a position of a center point of the first supporting portion and a position of a center point of the second supporting portion in the first detection image based on the first distance and preset size information.

The preset size information is size information of the first supporting portion and/or the second supporting portion.

Step S904: Determine an angle deviation, a height deviation, and a path deviation of the material handling apparatus based on the positions of the center points of the first supporting portion and the second supporting portion.

Specifically, a storage location angle, a storage location height, and a storage location center of the target storage location may be determined based on the positions of the center points of the first supporting portion and the second supporting portion of the target storage location. Then the angle deviation of the material handling apparatus relative to the target storage location may be determined based on the storage location angle, the height deviation of the material handling apparatus relative to the target storage location may be determined based on the storage location height, and the path deviation of the material handling apparatus relative to the target storage location may be determined based on the storage location center and the storage location type.

Step S905: Adjust the material handling apparatus of the robot to be aligned with the target storage location based on the angle deviation, the height deviation, the depth deviation, and the path deviation of the image acquisition apparatus.

Step S906: Determine whether the image center of the image acquisition apparatus is aligned with the center of the target storage location.

Specifically, after the material handling apparatus of the robot is aligned with the target storage location, and before the insert plate of the material handling apparatus is controlled to extend toward the target storage location, so that the insert plate is located between the first supporting portion and the second supporting portion of the target storage location, it is necessary to further determine whether the material handling apparatus is aligned with the target storage location, which can be realized by determining whether the image center of the image acquisition apparatus is aligned with the storage location center of the target storage location.

Further, if the image center of the image acquisition apparatus is not aligned with the storage location center of the target storage location, the material handling apparatus is adjusted until the image center of the image acquisition apparatus is aligned with the center of the target storage location.

Step S907: If the image center of the image acquisition apparatus is aligned with the center of the target storage location, control the material handling apparatus to extend toward the target storage location, so as to retrieve and/or store target goods.

The target goods are corresponding goods in the dispatch instruction.

Specifically, after it is determined that the image center of the image acquisition apparatus is aligned with the center of the target storage location, the insert plate of the material handling apparatus is controlled to extend to the target storage location, so as to place the insert plate between the first supporting portion and the second supporting portion of the target storage location. The target goods then can be placed to the target storage location, or can be retrieved from the target storage location so as to place the target goods to a preset layer of the temporary storage rack of the robot.

In this embodiment, before the goods retrieval and storage operation of the target storage location is performed, the first detection image of the target storage location is acquired through the image acquisition apparatus of the robot. Based on the first detection image, the positions of the center points of the first supporting portion and the second supporting portion of the target storage location are determined, so as to determine the pose position relationship between the material handling apparatus and the target storage location. Based on the pose position relationship, an automatic alignment of the material handling apparatus is realized, the alignment efficiency and accuracy are improved, and the safety of goods retrieval and storage is improved. In addition, there is no need to attach additional identification codes to racks or goods, which reduces the cost and improves warehousing efficiency.

FIG. 10 is a schematic structural diagram of an adjustment apparatus for a material handling apparatus according to an embodiment of the present application. The adjustment apparatus for the material handling apparatus is applicable to a robot, and an image acquisition apparatus is arranged on the material handling apparatus of the robot. As shown in FIG. 10, the adjustment apparatus for the material handling apparatus includes a first image acquisition module 1010, a pose position determination module 1020, and a material handling apparatus alignment module 1030.

Optionally, the rack identification code is arranged on a rack column corresponding to the target storage location. The pose position determination module 1020 includes: an identification code identifying unit configured to identify a rack identification code corresponding to the target storage location based on the first detection image; and a first pose position determination unit configured to determine the pose position relationship between the material handling apparatus and the target storage location based on an identification result if the identification succeeds.

Optionally, the first pose position determination unit is specifically configured to: determine an angle deviation, a height deviation, and a path deviation of the material handling apparatus based on position information of feature points of the rack identification code and angle information of an identification pattern of the rack identification code if the identification succeeds. The path deviation is a deviation between an image center of the image acquisition apparatus and a storage location center of the target storage location.

Optionally, the material handling apparatus alignment module 1030 is specifically configured to: determine a storage location type of the target storage location; determine a preset deviation based on the storage location type of the target storage location; adjust the material handling apparatus based on the preset deviation, so as to adjust the path deviation to the preset deviation; and respectively adjust an angle and a height of the material handling apparatus based on the angle deviation and the height deviation, so that the material handling apparatus is aligned with the target storage location.

Optionally, the adjustment apparatus for the material handling apparatus is further configured to: if the rack identification code corresponding to the target storage location is not identified based on the first detection image, adjust the image acquisition apparatus within a preset range and acquire at least one second detection image during and/or upon completion of the adjustment; if the second detection image includes the rack identification code corresponding to the target storage location, identify the rack identification code in the second detection image; and determine the pose position relationship between the material handling apparatus and the target storage location based on an identification result.

Optionally, the image acquisition apparatus includes a first image acquisition apparatus and a second image acquisition apparatus. The first image acquisition apparatus and the second image acquisition apparatus are respectively arranged on two sides of the material handling apparatus.

The first image acquisition module 1010 is specifically configured to: respectively acquire one first detection image through the first image acquisition apparatus and the second image acquisition apparatus, so as to obtain two first detection images. Correspondingly, the pose position determination module 1020 includes: an identification result obtaining unit configured to respectively identify the rack identification code corresponding to the target storage location in the two first detection images if the two first detection images both include the rack identification code, to obtain a first identification result and a second identification result; and a second pose position determination unit configured to determine the pose position relationship between the target storage location and the material handling apparatus based on the first identification result and the second identification result.

Optionally, the second pose position determination unit is specifically configured to: calculate a position average of each point of the rack identification code in the first identification result and the second identification result, and an angle average of the identification pattern of the rack identification code in the first identification result and the second identification result; and determine the pose position relationship between the target storage location and the material handling apparatus based on the position average and the angle average.

Optionally, the pose position determination module 1020 includes: a center point determination unit configured to determine positions of center points of the first supporting portion and the second supporting portion based on the first detection image, where the first supporting portion and the second supporting portion are configured to support goods placed at the target storage location; and a third pose position determination unit configured to determine the pose position relationship between the material handling apparatus and the target storage location based on the positions of the center points of the first supporting portion and the second supporting portion.

Optionally, the center point determination unit is specifically configured to: determine a first distance between the first supporting portion and the second supporting portion based on the first detection image; and determine the position of the center point of the first supporting portion and the position of the center point of the second supporting portion in the first detection image based on the first distance and preset size information, where the preset size information is size information of the first supporting portion and/or the second supporting portion.

Optionally, the third pose position determination unit is specifically configured to determine an angle deviation, a height deviation, and a path deviation of the material handling apparatus based on the positions of the center points of the first supporting portion and the second supporting portion.

Optionally, the adjustment apparatus for the material handling apparatus further includes: a fool-proof module configured to determine whether an image center of the image acquisition apparatus is aligned with the center of the target storage location after the material handling apparatus of the robot is adjusted to be aligned with the target storage location; and a goods handling module configured to control the material handling apparatus to extend toward the target storage location if the image center of the image acquisition apparatus is aligned with the center of the target storage location, so as to retrieve and/or store target goods, where the target goods are corresponding goods in a dispatch instruction.

Optionally, the adjustment apparatus for the material handling apparatus further includes: an internal goods handling module configured to: acquire a third detection image of a preset layer of a temporary storage rack of the robot through the image acquisition apparatus; determine positions of two preset points of the preset layer of the temporary storage rack based on the third detection image; determine a second angle deviation and a second height deviation between the material handling apparatus and the preset layer of the temporary storage rack based on the positions of the two preset points; determine, based on the second angle deviation and the second height deviation, whether the material handling apparatus is to collide with the temporary storage rack after the material handling apparatus extends toward the preset layer of the temporary storage rack; and if the material handling apparatus is not to collide with the temporary storage rack, control the material handling apparatus to place the target goods to the preset layer of the temporary storage rack, or control the material handling apparatus to retrieve the target goods from the preset layer of the temporary storage rack so as to place the target goods to the target storage location after the material handling apparatus is aligned with the target storage location.

The adjustment apparatus for the material handling apparatus provided in this embodiment of the present application may perform the adjustment method for the material handling apparatus provided in any embodiment of the present application, and has corresponding functional modules for performing the method and beneficial effects.

Figure 11:
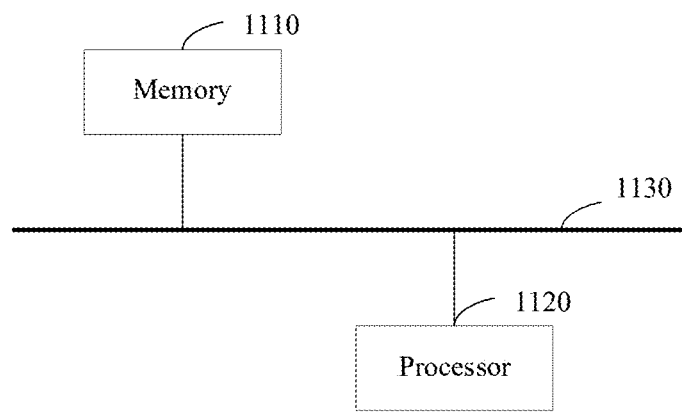
FIG. 11 is a schematic structural diagram of an adjustment device for a material handling apparatus according to an embodiment of the present application.

FIG. 11 is a schematic structural diagram of an adjustment device for the material handling apparatus according to an embodiment of the present application. As shown in FIG. 11, the adjustment device for the material handling apparatus includes a memory 1110, a processor 1120, and a computer program.

The computer program is stored in the memory 1110, and is configured to be executed by the processor 1120 to perform the adjustment method for the material handling apparatus provided in any one of the embodiments corresponding to FIG. 2, FIG. 5, FIG. 8, and FIG. 9 of the present application.

The memory 1110 is connected to the processor 1120 through a bus 1130.

Relevant descriptions can be understood by correspondingly referring to the relevant descriptions and effects corresponding to the steps in FIG. 2, FIG. 5, FIG. 8, and FIG. 9. Details are not described herein.

Figure 12:
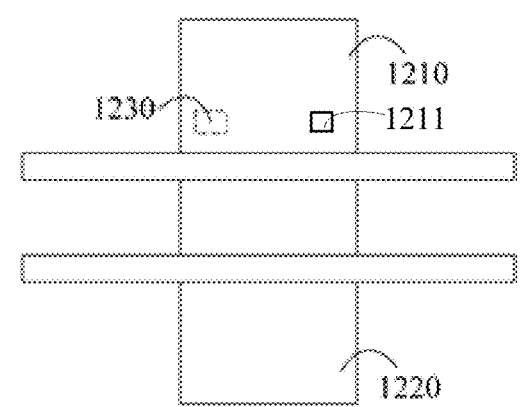
FIG. 12 is a schematic structural diagram of a robot according to an embodiment of the present application.

FIG. 12 is a schematic structural diagram of a robot according to an embodiment of the present application. As shown in FIG. 12, the robot includes a material handling apparatus 1210, a temporary storage rack 1220, and the adjustment device 1230 for the material handling apparatus.

An image acquisition apparatus 1211 is arranged on the material handling apparatus 1210. The temporary storage rack 1220 is configured to temporarily store goods during transport of goods by the robot. The adjustment device 1230 for the material handling apparatus is an adjustment device for the material handling apparatus provided in an embodiment shown in FIG. 11 of the present application.

In some embodiments, the material handling apparatus 1210 retrieves goods by forking and lifting. The material handling apparatus includes an insert plate. When the goods need to be retrieved, the insert plate is controlled to extend, so that the insert plate is placed at the bottom of the goods, thereby retrieving the goods.

Figure 13:
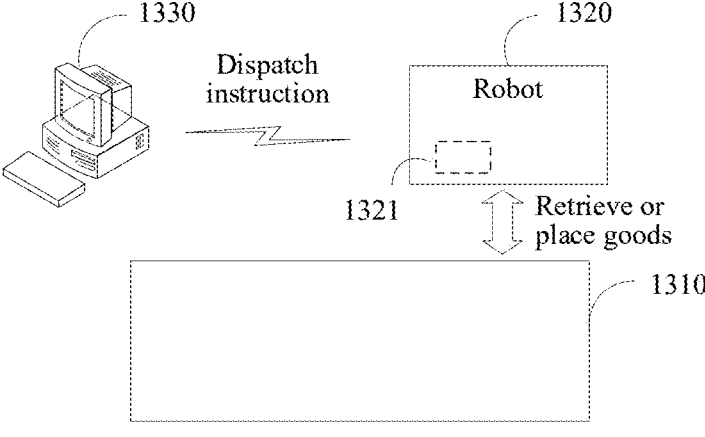
FIG. 13 is a schematic structural diagram of a warehousing system according to an embodiment of the present application.

FIG. 13 is a schematic structural diagram of a warehousing system according to an embodiment of the present application. As shown in FIG. 13, the warehousing system includes a rack 1310 and a robot 1320.

The robot 1320 is the robot provided in the embodiment shown in FIG. 12 of the present application, and an image acquisition apparatus 1321 is arranged on the material handling apparatus of the robot.

In some embodiments, the warehousing system further includes a dispatch device 1330 configured to send a dispatch instruction to the robot 1320, so that the robot 1320 can perform a corresponding operation of retrieving or storing goods based on the dispatch instruction.

In some embodiments, the warehousing system further includes one or more of a workstation, a discharger, a hoist, a conveyor line, and the like.

An embodiment of the present application provides a computer-readable storage medium storing a computer program. The computer program is executed by a processor to perform the adjustment method for the material handling apparatus provided in any of the embodiments corresponding to FIG. 2, FIG. 5, FIG. 8, and FIG. 9 of the present application.

The computer-readable storage medium may be a ROM, a random access memory (RAM), a CD-ROM, a magnetic tape, a floppy disk, an optical data storage device, and the like.

An embodiment of the present application further provides a program product. The program product includes executable instructions stored in a readable storage medium. The executable instructions can be read from the readable storage medium by at least one processor of the adjustment device for the material handling apparatus or a warehousing system. The at least one processor executes the executable instructions, so that a rack dispatch apparatus performs the adjustment method for the material handling apparatus provided in the above various implementations.

In the several embodiments provided in the present application, it should be understood that the disclosed device and method may be implemented in other manners. For example, the device embodiments described above are merely exemplary. For example, division of modules is merely logical function division, and there may be other division manners during actual implementation. For example, a plurality of modules may be combined or integrated into another system, or some features may be omitted or not executed. In addition, the shown or discussed mutual coupling or direct coupling or communication connections may be implemented by some interfaces. The indirect coupling or communication connection between the apparatuses or modules may be electrical, mechanical, or in other forms.

The modules described as separate components may or may not be physically separated, and the components shown as modules may or may not be physical units, which may be located in one place or may be distributed on a plurality of network units. Some or all of the modules may be selected according to actual needs to achieve the objectives of the solutions of the embodiments.

In addition, functional modules in the embodiments of the present application may be integrated into one processing unit, or each module may exist alone physically. Alternatively, two or more modules may be integrated into one unit. The unit integrated by the modules may be implemented in the form of hardware, or may be implemented in the form of hardware and a software function unit.

The above integrated module in the form of software functional modules may be stored in one computer-readable storage medium. The software function module is stored in a storage medium and includes several instructions for causing a computer device (which may be a personal computer, a server, a network device, or the like) or a processor to perform some steps of the method described in the embodiments of the present application.

It should be understood that the processor may be a central processing unit (CPU), and may also be other general-purpose processors, a digital signal processor (DSP), or an application specific integrated circuit (ASIC), or the like. The general-purpose processor may be a microprocessor, or the processor may be any conventional processor or the like. The steps of the methods disclosed with reference to the present invention may be directly performed by a hardware processor, or may be performed by using a combination of hardware and software modules in the processor.

The memory may include a high-speed RAM memory, or may include a non-volatile storage (NVM), for example, at least one disk memory, a USB flash disk, a mobile hard disk drive, a read-only memory, a magnetic disk, or an optical disc, or the like.

The bus may be an industry standard architecture (ISA for short) bus, a peripheral component interconnect (PCI for short) bus, or an extended industry standard architecture (EISA for short) bus, or the like. The bus may be classified as an address bus, a data bus, or a control bus, or the like. For ease of representation, the bus in the accompanying drawings of the present application is not limited to only one bus or one type of bus.

The storage medium may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc. The storage medium may be any available medium accessible to a general-purpose or dedicated computer.

For example, a storage medium is coupled to a processor, so that the processor can read information from the storage medium or write information into the storage medium. Certainly, the storage medium may be a component of the processor. The processor and the storage medium may be located in the ASIC. Certainly, the processor and the storage medium may also exist in an electronic device or a master device as a discrete component.

A person of ordinary skill in the art may understand that all or some of the steps of the method embodiments may be performed by a hardware related to program instructions. The program may be stored in a computer-readable storage medium. When the program is executed, steps of the foregoing method embodiments are performed. The storage medium described above includes: various media such as a ROM, a RAM, a magnetic disk, an optical disk, or the like that can store program code.

Finally, it should be noted that the foregoing embodiments are merely used for describing the technical solutions of the present application, rather than limiting the present application. Although the present application is described in detail with reference to the foregoing embodiments, those of ordinary skill in the art should understand that modifications may still be made to the technical solutions described in the foregoing embodiments, or equivalent replacements may be made to some or all of the technical features. However, these modifications or replacements do not make the essence of corresponding technical solutions depart from the scope of the technical solutions of the embodiments of the present application.

27

What is claimed is:

1. A method for adjusting a material handling apparatus of a robot, wherein an image acquisition apparatus is arranged on the material handling apparatus, and the material handling apparatus is provided with an insert plate, wherein the method comprises:

acquiring a first detection image through the image acquisition apparatus when the robot moves to a target ground identifier, wherein the target ground identifier is a ground identifier corresponding to a target storage location, wherein a supporting portion is arranged at the target storage location and is configured to support goods, wherein the supporting portion comprises a first supporting portion and a second supporting portion, the first supporting portion and the second supporting portion being spaced apart by a distance;

determining a pose position relationship between the target storage location and the material handling apparatus based on an identification pattern in the first detection image;

adjusting the material handling apparatus of the robot to be aligned with the target storage location based on the pose position relationship, so that the insert plate of the material handling apparatus is able to be placed between the first supporting portion and the second supporting portion; and transporting the goods to or from the target storage location;

wherein the image acquisition apparatus comprises a first image acquisition apparatus and a second image acquisition apparatus, the first image acquisition apparatus and the second image acquisition apparatus being respectively arranged on two sides of the material handling apparatus;

wherein the acquiring the first detection image through the image acquisition apparatus comprises:

respectively acquiring one first detection image through the first image acquisition apparatus and the second image acquisition apparatus, to obtain two first detection images;

wherein the determining the pose position relationship between the target storage location and the material handling apparatus based on the identification pattern in the first detection image comprises:

identifying the identification pattern corresponding to the target storage location in the two first detection images respectively if the two first detection images both comprise the identification pattern, to obtain a first identification result and a second identification result; and determining the pose position relationship between the target storage location and the material handling apparatus based on the first identification result and the second identification result;

wherein the determining the pose position relationship between the target storage location and the material handling apparatus based on the first identification result and the second identification result comprises:

calculating a position average of points of the identification pattern in the first identification result and the second identification result, and an angle average of the identification pattern in the first identification result and the second identification result; and determining the pose position relationship between the target storage location and the material handling apparatus based on the position average and the angle average.

2. The method according to claim 1, wherein the identification pattern is arranged on a rack column corresponding to the target storage location;

wherein the determining the pose position relationship between the target storage location and the material handling apparatus based on the identification pattern in the first detection image comprises:

identifying the identification pattern corresponding to the target storage location based on the first detection image; and determining the pose position relationship between the material handling apparatus and the target storage location based on an identification result.

3. The method according to claim 2, wherein the determining the pose position relationship between the material handling apparatus and the target storage location based on the identification result comprises:

determining at least one of an angle deviation, a height deviation, and a path deviation of the material handling apparatus based on position information of the identification pattern and angle information of the identification pattern;

wherein the path deviation is a deviation between an image center of the image acquisition apparatus and a storage location center of the target storage location.

4. The method according to claim 3, wherein the determining at least one of the angle deviation, the height deviation, and the path deviation of the material handling apparatus comprises:

at least partially determining the path deviation of the material handling apparatus;

wherein the adjusting the material handling apparatus of the robot to be aligned with the target storage location based on the pose position relationship comprises:

determining a storage location type of the target storage location;

determining a preset deviation based on the storage location type of the target storage location;

adjusting the material handling apparatus based on the preset deviation, to adjust the path deviation to the preset deviation.

5. The method according to claim 3, wherein the determining at least one of the angle deviation, the height deviation, and the path deviation of the material handling apparatus comprises:

at least partially determining the angle deviation of the material handling apparatus;

wherein the adjusting the material handling apparatus of the robot to be aligned with the target storage location based on the pose position relationship comprises:

adjusting an angle of the material handling apparatus based on the angle deviation.

6. The method according to claim 3, wherein the determining at least one of the angle deviation, the height deviation, and the path deviation of the material handling apparatus comprises:

at least partially determining the height deviation of the material handling apparatus;

wherein the adjusting the material handling apparatus of the robot to be aligned with the target storage location based on the pose position relationship comprises:

adjusting a height of the material handling apparatus based on the height deviation.

7. The method according to claim 1, wherein the identification pattern corresponds to the target storage location, the method further comprising:

if the identification pattern corresponding to the target storage location is not identified from the first detection image, adjusting the image acquisition apparatus within a preset range and acquiring at least one second detection image;

identifying the identification pattern corresponding to the target storage location in the second detection image if the second detection image comprises the identification pattern; and determining the pose position relationship between the material handling apparatus and the target storage location based on an identification result.

8. The method according to claim 1, wherein after the adjusting the material handling apparatus of the robot to be aligned with the target storage location, the method further comprises:

determining whether an image center of the image acquisition apparatus is aligned with a center of the target storage location; and controlling the material handling apparatus to extend toward the target storage location if the image center of the image acquisition apparatus is aligned with the center of the target storage location, so as to transport the goods to or from the target storage location.

9. The method according to claim 1, further comprising:

acquiring a layer detection image of a preset layer of a temporary storage rack of the robot through the image acquisition apparatus;

determining positions of two preset points of the preset layer of the temporary storage rack based on the layer detection image;

determining a second angle deviation and a second height deviation between the material handling apparatus and the preset layer of the temporary storage rack based on the positions of the two preset points;

determining, based on the second angle deviation and the second height deviation, whether the material handling apparatus is to collide with the temporary storage rack after the material handling apparatus extends toward the preset layer of the temporary storage rack; and if the material handling apparatus is not to collide with the temporary storage rack, controlling the material handling apparatus to transport goods to or from the preset layer of the temporary storage rack.

10. A method for adjusting a material handling apparatus of a robot, wherein an image acquisition apparatus is arranged on the material handling apparatus, and the material handling apparatus is provided with an insert plate, wherein the method comprises:

acquiring a first detection image through the image acquisition apparatus when the robot moves to a target ground identifier, wherein the target ground identifier is a ground identifier corresponding to a target storage location, wherein a supporting portion is arranged at the target storage location and is configured to support goods, wherein the supporting portion comprises a first supporting portion and a second supporting portion, the first supporting portion being spaced apart from second supporting portion;

determining a pose position relationship between the target storage location and the material handling apparatus based on key points corresponding to the first supporting portion and the second supporting portion in the first detection image;

adjusting the material handling apparatus of the robot to be aligned with the target storage location based on the pose position relationship, so that the insert plate of the material handling apparatus is able to be placed between the first supporting portion and the second supporting portion; and transporting the goods to or from the target storage location;

wherein the method further comprises:

acquiring a layer detection image of a preset layer of a temporary storage rack of the robot through the image acquisition apparatus;

determining positions of two preset points of the preset layer of the temporary storage rack based on the layer detection image;

determining a second angle deviation and a second height deviation between the material handling apparatus and the preset layer of the temporary storage rack based on the positions of the two preset points;

determining, based on the second angle deviation and the second height deviation, whether the material handling apparatus is to collide with the temporary storage rack after the material handling apparatus extends toward the preset layer of the temporary storage rack; and if the material handling apparatus is not to collide with the temporary storage rack, controlling the material handling apparatus to transport goods to or from the preset layer of the temporary storage rack.

11. The method according to claim 10, wherein the determining the pose position relationship between the target storage location and the material handling apparatus based on the key points in the first detection image comprises:

determining positions of center points of the first supporting portion and the second supporting portion based on the first detection image; and determining the pose position relationship between the material handling apparatus and the target storage location based on the positions of the center points of the first supporting portion and the second supporting portion.

12. The method according to claim 11, wherein the determining the positions of the center points of the first supporting portion and the second supporting portion based on the first detection image comprises:

determining a distance between the first supporting portion and the second supporting portion based on the first detection image; and determining a position of a center point of the first supporting portion and a position of a center point of the second supporting portion in the first detection image based at least in part on the distance.

13. The method according to claim 11, wherein the determining the pose position relationship between the material handling apparatus and the target storage location based on the positions of the center points of the first supporting portion and the second supporting portion comprises:

determining at least one of an angle deviation, a height deviation, and a path deviation of the material handling apparatus based on the positions of the center points of the first supporting portion and the second supporting portion.

14. The method according to claim 10, wherein after the adjusting the material handling apparatus of the robot to be aligned with the target storage location, the method further comprises:

determining whether an image center of the image acquisition apparatus is aligned with a center of the target storage location; and controlling the material handling apparatus to extend toward the target storage location if the image center of the image acquisition apparatus is aligned with the center of the target storage location, so as to transport the goods to or from the target storage location.

15. An apparatus for adjusting a material handling apparatus, wherein the material handling apparatus is arranged on a robot, the material handling apparatus being provided with an image acquisition apparatus and an insert plate, the method comprising:

a memory configured to store computer-executable instructions; and at least one processor configured to execute the computer-executable instructions stored in the memory so as to perform the method according to claim 1.

* * * * *